United States Patent
Jeong et al.

(10) Patent No.: US 9,182,421 B2
(45) Date of Patent: Nov. 10, 2015

(54) INERTIA SENSOR

(75) Inventors: Heewon Jeong, Tokyo (JP); Munenori Degawa, Kokubunji (JP); Masahide Hayashi, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 390 days.

(21) Appl. No.: 13/807,284

(22) PCT Filed: May 25, 2011

(86) PCT No.: PCT/JP2011/061954
§ 371 (c)(1),
(2), (4) Date: Dec. 27, 2012

(87) PCT Pub. No.: WO2012/005062
PCT Pub. Date: Jan. 12, 2012

(65) Prior Publication Data
US 2013/0098152 A1    Apr. 25, 2013

(30) Foreign Application Priority Data
Jul. 6, 2010 (JP) .................. 2010-153818

(51) Int. Cl.
*G01C 19/56* (2012.01)
*G01C 19/5719* (2012.01)
(Continued)

(52) U.S. Cl.
CPC .............. *G01P 9/04* (2013.01); *G01C 19/574* (2013.01); *G01C 19/5719* (2013.01); *G01C 19/5747* (2013.01)

(58) Field of Classification Search
CPC ........... G01C 19/5719; G01C 19/5747; G01C 19/574; G01C 19/5712; G01C 19/5726
USPC ............... 73/504.12, 504.14, 504.02, 504.04
See application file for complete search history.

(56) References Cited

U.S. PATENT DOCUMENTS

| | | | |
|---|---|---|---|
| 4,524,619 A | 6/1985 | Staudte | |
| 5,668,316 A | 9/1997 | Iwai et al. | |

(Continued)

FOREIGN PATENT DOCUMENTS

| | | | |
|---|---|---|---|
| JP | 7-243857 A | 9/1995 | |
| JP | 2000-9470 A | 1/2000 | |

(Continued)

OTHER PUBLICATIONS

International Search Report dated Aug. 16, 2011 including English-language translation (Four (4) pages).

*Primary Examiner* — Helen Kwok
(74) *Attorney, Agent, or Firm* — Crowell & Moring LLP

(57) ABSTRACT

This invention is directed to provision of high-performance inertial sensor that can sustain SNR even in an environment where vibration disturbance exists. A vibration type inertial sensor comprises: two deadweights (2, 3); means (C1, C2, C3, C4, +vd, −vd) for displacing the two dead weights in the anti-phase; two sets of electrodes (C5, C6, C7, C8) for detecting, as capacitance changes, the displacements of the two dead weights; and a C/V converting unit (53) for converting the capacitance changes of the electrodes to electric signals. In the vibration type inertial sensor, a set of electrodes (e.g., C5 and C8), which exhibit an increased electrostatic capacitance therebetween in the case where the two dead weights (2, 3) are displaced in the anti-phase, are electrically connected to each other, and a set of electrodes (e.g., C6 and C7), which exhibit a reduced electrostatic capacitance therebetween in the foregoing case, are electrically connected to each other, and further these sets of electrodes are connected to the C/V converting unit (53).

13 Claims, 11 Drawing Sheets

(51) Int. Cl.
  *G01C 19/5747* (2012.01)
  *G01C 19/574* (2012.01)

(56) References Cited

U.S. PATENT DOCUMENTS

| | | | |
|---|---|---|---|
| 7,062,970 B2* | 6/2006 | Higuchi | 73/504.12 |
| 2003/0101815 A1* | 6/2003 | Orsier | 73/504.12 |
| 2005/0072231 A1* | 4/2005 | Chojnacki et al. | 73/504.14 |
| 2005/0216149 A1 | 9/2005 | Kato | |
| 2006/0000280 A1* | 1/2006 | Higuchi | 73/504.12 |
| 2007/0272015 A1* | 11/2007 | Kazama et al. | 73/504.08 |
| 2008/0236280 A1* | 10/2008 | Johnson et al. | 73/504.14 |
| 2009/0320591 A1* | 12/2009 | Johnson | 73/504.12 |
| 2010/0037691 A1* | 2/2010 | Jeong et al. | 73/504.12 |
| 2010/0095769 A1* | 4/2010 | Matsumoto et al. | 73/504.12 |
| 2010/0186505 A1* | 7/2010 | Sattler et al. | 73/504.12 |
| 2010/0186506 A1* | 7/2010 | Robert | 73/504.12 |
| 2010/0307242 A1* | 12/2010 | Sakai et al. | 73/504.12 |

FOREIGN PATENT DOCUMENTS

| | | |
|---|---|---|
| JP | 2001-133268 A | 5/2001 |
| JP | 2001-153659 A | 6/2001 |
| JP | 2002-350138 A | 12/2002 |
| JP | 2005-274456 A | 10/2005 |
| JP | 2009-192426 A | 8/2009 |
| JP | 2010-54431 A | 3/2010 |

* cited by examiner (a)

(b)

(c)

INERTIA SENSOR

TECHNICAL FIELD

The present invention relates to an inertial sensor using a MEMS (Micro Electro Mechanical System) fabricated with a semiconductor microfabrication technology and capable of measuring angular velocity or the like by detecting a physical quantity related to Coriolis force generated in vibrating objects.

BACKGROUND ART

Well known types of angular rate sensors (gyro sensors) include: mechanical type sensors that utilize the precession of a rotating body; optical type sensors that utilize changes in time to receive laser beams travelling within a rotating enclosure; and fluid type sensors that spray a sensing gas onto a heated wire in an enclosure and detecting the sprayed gas amount variations caused by rotation of the enclosure through temperature of the wire.

Recently, there is a soaring demand for angular rate sensors used for car navigation systems, a vehicle's antiskid brake systems, balance control systems for bipedal robots and mono-wheel vehicles and other systems to detect the orientation and the attitude of vehicles. Compared with the aforementioned types of sensors, inexpensive, light and compact vibration type angular rate sensors (Patent Literature 1) are going mainstream. The vibration type angular rate sensors are configured to, when an angular velocity is exerted on an oscillator vibrating in a predetermined reference direction, detect a new vibration component (hereinafter referred to as "angular velocity vibration component") based on a Coriolis force in a detecting direction orthogonal to the reference direction and output angular velocity information based on the detected vibration component.

In the case of a car navigation system, for example, a GPS (Global Positioning System), which monitors current location, can detect the macroscopic changes in a traveling direction of a vehicle, but cannot follow abrupt direction changes at an intersection or the like. To detect abrupt direction changes, some car navigation systems employ a method for detecting the turning movement of the vehicle in the form of angular velocity and tracing the angle of how much the vehicle has turned by using the values of the time integral of the angular velocity.

In the case of an antiskid brake system of a vehicle, as another example, a value (command value) obtained by a steering angle sensor installed in a steering wheel is compared with an output value (measured value) obtained by an angular rate sensor built in the antiskid brake system to determine whether the car is skidding. Based on the comparison results, the engine output and braking force of the respective four wheels are controlled so as to stop skidding.

In yet another example, balance control systems in mono-wheel vehicles and bipedal robots need to always control the balance of the vehicles and robots to prevent side toppling, side rolling and keep their proper attitude. The balance control system employs a method for controlling the balance with an angular rate sensor or an accelerometer as follows. When a vehicle or a robot is rotated or has the center of gravity shifted by wind, inclination, loads or other factors, the angular rate sensor or accelerometer measures the rotation or the displacement of the center of gravity to move the wheels toward the rotational direction or control an actuator positioned in the direction in which the center of gravity has shifted to generate larger force, thereby keeping the vehicle or robot in balance.

By the way, in the vibration type angular rate sensors, motion components of an oscillator in a detecting direction are not limited to Coriolis force derived from angular velocity. When the sensor is mounted in a vehicle, a robot or the like, unwanted acceleration components, such as sudden shock and vibrations caused by other factors than angular velocity, are often added to the sensor. Since such unwanted acceleration components, of course, appear as noise for angular velocity to be originally detected, it is needless to say that when the angular rate sensor is used to detect the orientation and attitude of a vehicle, the unwanted acceleration components directly cause deterioration of the detection accuracy. Patent Literature 2 and Patent Literature 3 disclose sensors having two dead weights (oscillators) combined so as to oscillate in anti-phase with each other in a reference vibration direction and outputting the difference between angular velocity vibration component waveforms of the respective sensors as a final angular velocity waveform. The oscillators oscillated in anti-phase produce anti-phase angular velocity oscillation components, but the aforementioned unwanted acceleration components appear as in-phase components. The in-phase acceleration components are offset by taking the differential waveform, and only the necessary angular velocity vibration components are left, thereby improving detection accuracy.

CITATION LIST

Patent Literature

Patent Literature 1: U.S. Pat. No. 4,524,619
Patent Literature 2: Japanese Unexamined Patent Application Publication No. 2000-9470
Patent Literature 3: Japanese Unexamined Patent Application Publication No. 2001-153659

SUMMARY OF INVENTION

Technical Problem

The same can be said of other applications cited in the above examples; however, an angular rate sensor incorporated in an antiskid brake system will be described herein for clarity and understandable explanations. In an existing antiskid brake system, even though an ECU (Electronic Control Unit) for brake control, a braking pressure producing device (hydraulic motor, solenoid-operated valve for branching braking pressure) and other relevant components are arranged in an engine compartment, the angular rate sensor is placed in the interior room of a vehicle because the sensor is an essential component to control a brake and the interior room has relatively less vibration disturbance and can be easily provided with vibration suppression/isolation measures for the reason of using the principle of resonance phenomenon. Therefore, the antiskid brake system needs to contain, in addition to the angular rate sensor, ECU and braking pressure producing device, a microcomputer for CAN (Controller Area Network) communication, cables for transferring signals from the interior room to the engine compartment, harness used for securing the sensor and vibration suppression and isolation, and other components, which requires additional cost.

In these days, further cost reduction has been increasingly required with the widespread use of the vibration type angular rate sensors for vehicles. To respond to the request, the angular rate sensors tend to be mounted on the hydraulic control ECU board with the LSI and chip capacitors as a single electronic component. However, if the sensor is mounted on the ECU board, not in the interior room of the vehicle, the sensor needs to improve the resistance against a harsh environment including temperature and vibration in the engine compartment. Especially, the vibrations from the hydraulic motor and solenoid-operated valve activated with brake control contain not only periodical valve vibration, but also impulsive vibration. The vibrations have a wide frequency band corresponding to a few tens to a few hundreds G at maximum, which would not have been expected from the interior room of the vehicle.

Therefore, the method for taking the differential waveform as disclosed in Patent Literature 2 and Patent Literature 3 is not appropriate, because the detection circuit is saturated before taking the difference, and the sensor may lose the sensing functions. A possible solution is to set a wider conversion range of a first-stage converting unit, which is arranged before taking the difference; however, a small signal (signal derived from angular velocity vibration) needs to be detected from a large amount of signals (signals derived from disturbance+signals derived from angular velocity vibration), and therefore noise components caused by thermal noise and other noises of the detection circuit may relatively increase. Consequently, deterioration of SNR (Signal to Noise Ratio) is predictable.

An object of the present invention is to provide a high-performance inertial sensor that can maintain an SNR even in an environment where vibration disturbance exists.

The above object, the other objects and new features of the present invention will become apparent from the disclosure of the specification and accompanying drawings.

Solution to Problem

The following is a brief description of an outline of the typical invention disclosed in the present application.

The vibration type inertial sensor according to the present invention has been made to solve the aforementioned problems and includes: a supporting substrate on which a conductive layer is formed with an insulating interlayer formed therebetween in the thickness direction; two dead weights disposed so as to oscillate in a direction of the surface of the conductive layer as a reference vibration direction, or a first direction, and be displaced in anti-phase with each other by electrostatic force, the dead weights oscillating in a second direction orthogonal to the first direction when an angular velocity is applied to the dead weights; a plurality of detecting electrodes whose electrostatic capacitance changes with displacements of the two dead weights in the first direction and second direction; and a C/V converting unit converting the capacitance change of the detecting electrodes into electrical signals.

The sensor is characterized in that the detecting electrodes, whose electrostatic capacitance changes in the same direction (in a decreasing direction and in an increasing direction when the two dead weights are displaced in anti-phase in the first direction, are electrically connected with each other before the C/V converting unit.

In addition, the inertial sensor according to the present invention is characterized in that the detecting electrodes, whose electrostatic capacitance changes in the same direction (in a decreasing direction and in an increasing direction when the two dead weights are displaced in anti-phase in the second direction, are electrically connected with each other before the C/V converting unit.

Advantageous Effects of Invention

The effects obtained by typical embodiments of the invention disclosed in the present application will be briefly described below.

According to the angular rate sensor of the present invention, when the dead weights are displaced in anti-phase in the first direction or the second direction, the detecting electrodes, whose electrostatic capacitance changes in the same direction (in a decreasing direction and in an increasing direction with the displacements in the respective directions, are electrically connected with each other before the C/V converting unit. Thus, the vibration disturbance components, which are a main cause to displace the dead weights in phase, are offset each other in the detecting electrodes and therefore are not input to the C/V converting unit. As a result, even if a large vibration disturbance is applied, the C/V converting unit is not saturated and the sensor can function properly. Note that it is theoretically desirable that the first direction and the second direction are orthogonal to each other; however, it is not limited thereto, and the second direction can be any direction as long as the displacement caused by the angular velocity vibration can be measured.

Furthermore, the detecting electrodes to be connected may be only the detecting electrodes for measuring the displacement in the first direction or the detecting electrodes for the second direction, or the detecting electrodes for both directions. This is determined according to the application fields of the sensor.

DESCRIPTION OF EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, etc.), the number of the elements is not limited to a specific number unless otherwise stated or except in the case where the number is apparently limited to a specific number in principle. The number larger or smaller than the specified number is also applicable.

Furthermore, in the embodiments described below, it goes without saying that the components (including element steps, etc.) are not always indispensable unless otherwise stated or except in the case where the components are apparently indispensable in principle.

Similarly, in the embodiments described below, when the shape of the components, positional relation thereof, and the like are mentioned, the substantially approximate and similar shapes and the like are included therein unless otherwise stated or except in the case where it is conceivable that they are apparently excluded in principle. The same goes for the numerical value and the range described above.

Also, components having the same function are denoted by the same reference symbols throughout the drawings for describing the embodiments, and the repetitive description thereof is omitted. Note that, in some drawings used in the embodiments, hatching is used even in a plan view so as to make the drawings easy to see.

Embodiment 1

Figure 1:
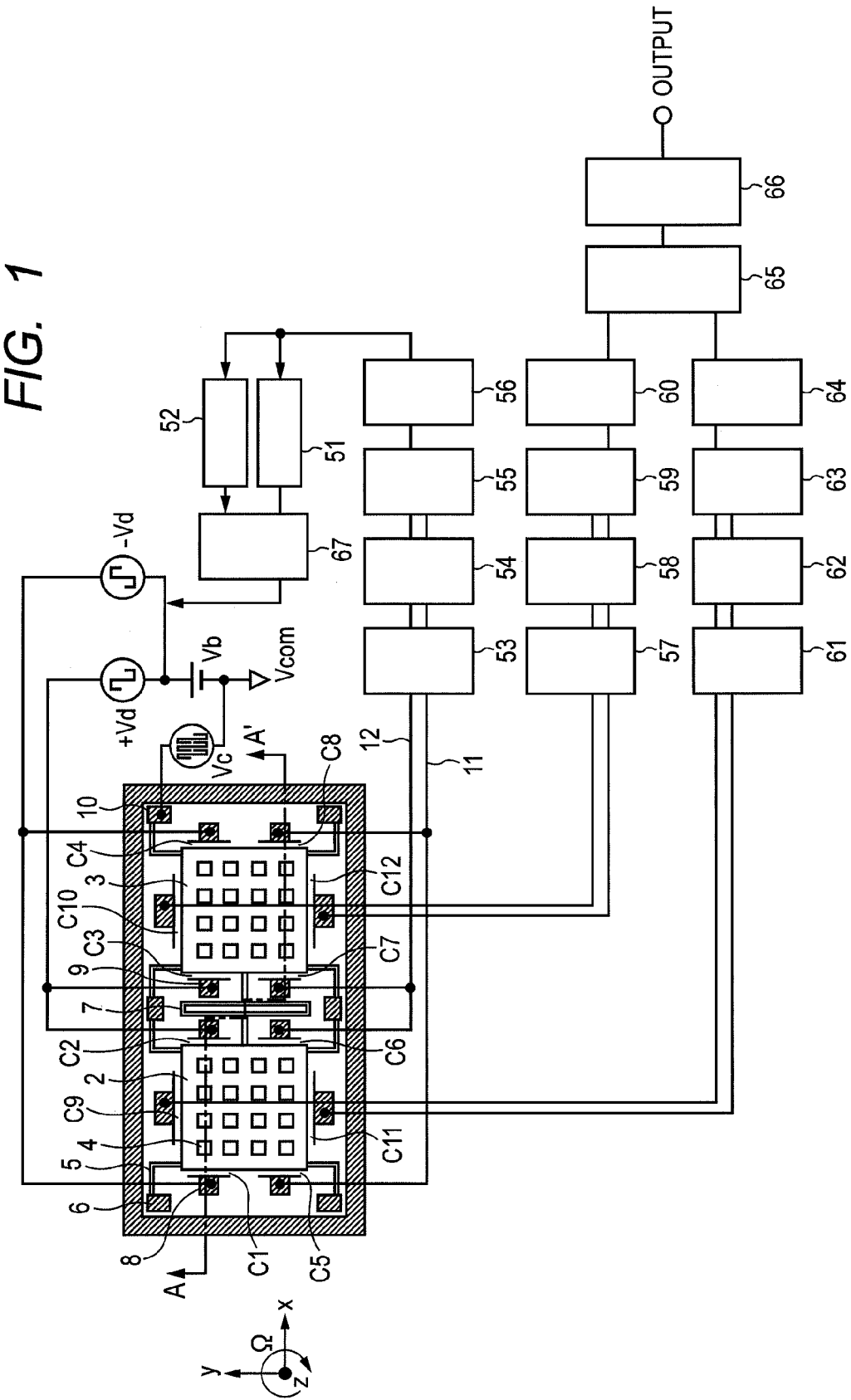
FIG. 1 is a schematic diagram of the entire configuration of the inertial sensor (angular rate sensor) according to Embodiment 1.

A vibration type angular rate sensor (hereinafter, simply referred to as "angular rate sensor") S1 according to Embodiment 1 of the present invention will be described with reference to the drawings. FIG. 1 is a schematic diagram of the entire configuration of the angular rate sensor S1. First, the configuration of the angular rate sensor S1 will be described. In order to form mechanical components, such as dead weights and anchors, the angular rate sensor S1 uses, for example, an SOI (Silicon On Insulator) substrate 1. The SOI substrate 1 shown in the cross-sectional view, taken along the line A-A', in FIG. 2, includes a supporting substrate 1a, an insulating interlayer 1b formed on the supporting substrate 1a and a conductive layer 1c formed on the insulating interlayer 1b. The supporting substrate 1a is made of, for example, silicon (Si), while the insulating interlayer 1b is made of, for example, silicon oxide (SiO$_2$). The conductive layer 1c formed on the insulating interlayer 1b is made of, for example, electrically conductive silicon.

The total thickness of the supporting substrate 1a and insulating interlayer 1b is, for example, a few tens to a few hundreds μm, while the thickness of the conductive layer 1c is, for example, a few to a few tens μm. Although an SOI substrate is used in this embodiment, the SOI substrate can be anything as long as it functions as a semiconductor substrate. For example, the substrate can be made of electrically conductive polysilicon by using a surface MEMS technology, or, the conductive layer can be made of a plated metal, such as nickel (Ni).

Some microfabrication processes are subjected to the conductive layer 1c of the SOI substrate 1 to form components of the angular rate sensor S1 according to the present embodiment. In a method for forming the components on the conductive layer 1c, a resist, which reacts to light or electron beams, is applied on the conductive layer 1c, and then part of the resist on the conductive layer 1c is removed by photolithography or electron beam lithography. Subsequently, the exposed part of the conductive layer 1c is removed by taking advantage of dry etching, such as RIE (Reactive Ion Etching), or wet etching using alkaline agent, such as TMAH (Tetramethylammonium hydroxide) and KOH (potassium hydroxide). After removing the remaining resist, the insulating interlayer 1b is removed with hydrofluoric acid gas or solution or the like.

Figure 2:
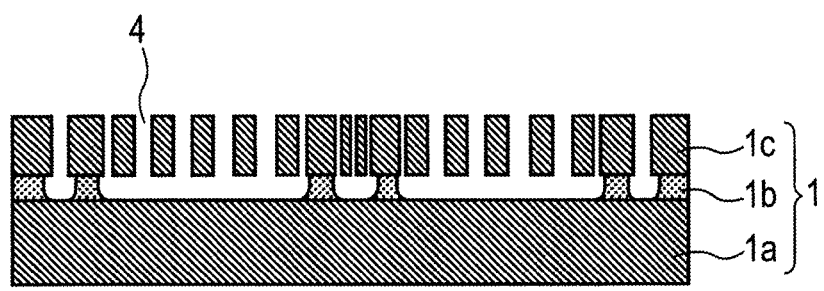
FIG. 2 is a cross-sectional view taken along the line A-A' in FIG. 1.

As appreciated from the shape of the insulating interlayer 1b in FIG. 2, the insulating interlayer 1b under the conductive layer 1c formed relatively narrow in width is completely removed and the conductive layer 1c looks as if it is floating above the supporting substrate 1a, while the insulating interlayer 1b under the conductive layer 1c formed relatively large in width is left and the conductive layer 1c is supported on the supporting substrate 1a. Through these processes, the mechanical components of the angular rate sensor S1, including dead weights, anchors, and beams which will be described later, can be formed in the conductive layer 1c.

The angular rate sensor S1 according to Embodiment 1 includes two dead weights 2, 3 formed by the aforementioned microfabrication method. Since the dead weights 2, 3 often have a relatively large area, holes 4 are formed to facilitate penetration of etching solution, such as hydrofluoric acid, that is used to remove the insulating interlayer 1b. Since the SOI substrate 1 is adopted, Embodiment 1 needs the holes 4; however, some other types of substrates, for example, a glass-silicon laminated substrate does not require the holes 4 because there is no need to remove the insulating interlayer 1b.

The deadweights 2, 3 are suspended from anchors 6 with flexible supporting beams 5 in x-direction, which is a first direction, and in y-direction, which is a second direction. The anchors 6 are relatively large in area and fixed on the supporting substrate 1a with the insulating interlayer 1b.

In addition, the dead weights 2, 3 are connected with a linking beam 7 to share the vibrational energy and form a tuning fork structure. It is possible to oscillate the two dead weights 2, 3 in anti-phase by applying anti-phase synchronized driving force, which will be described later, without the tuning fork structure. Therefore, the linking beam 7 is not always a prerequisite to produce the effect of the present invention. In short, if the dead weights 2, 3 including the supporting beams 5 are identical, the linking beam 7 can be omitted.

However, the aforementioned microfabrication processes to form the dead weights 2, 3 and supporting beams 5 involve slight variations in the result. Actually, the process variations may bring subtle differences in system vibration characteristics, such as natural frequency, between a vibration system including the dead weight 2 and supporting beams 5 and a vibration system including the deadweight 3 and supporting beams 5. By connecting the deadweights 2, 3 with the linking beam 7, the dead weights 2, 3, the supporting beams 5 and the linking beam 7 establish a single tuning fork vibration system (hereinafter, referred to as "drive vibration system"). Even if process variations occur, the natural frequency, phase relation, mechanical quality factor (Value Q) of the two dead weights 2, 3 can be made equal.

Next, the principle of operation and the circuitry configuration of the angular rate sensor S1 according to Embodiment 1 will be described.

The two dead weights 2, 3 are excited in the first direction (x-direction) by driving electrodes 8 (C1, C4) arranged on outer sides of the dead weights 2, 3 and driving electrodes 9 (C2, C3) arranged on inner sides of the dead weights 2, 3. The driving electrodes 8 are applied with a driving signal of Vcom+Vb−Vd, while the driving electrodes 9 are applied with a driving signal of Vcom+Vb+Vd. In addition, the dead weights 2, 3 are applied with Vcom via a common electrode 10. As a result, the driving electrodes 8, 9 and the dead weights 2, 3 have a potential difference of Vb±Vd therebetween and the potential difference generates electrostatic force that oscillates the two dead weights 2, 3 in anti-phase.

A carrier signal Vc, which will be described later, is also applied to the common electrode 10. The frequency of the carrier signal Vc is a few hundreds kHz that is too high for the drive vibration system to follow. Because of this, the carrier signal Vc does not act as a driving force.

In order to obtain a large drive amplitude X with a small driving voltage, the frequency of the driving signal Vd (hereinafter also referred to as drive frequency) can be set equal to the anti-phase natural frequency of the drive vibration system made up with the dead weights 2, 3, the supporting beams 5 and the linking beam 7, although the present invention is not limited thereto. The angular rate sensor S1 according to the present embodiment employs an AFC (Auto Frequency Control) 51 using a PLL (Phase Locked Loop) so as to keep the drive frequency tracking the change in the natural frequency of the drive vibration system due to ambient environment (temperature, pressure) variations.

Expressions 1 and 2 are relational expressions between the drive amplitude X and Coriolis force Fc and between the amplitude (detection amplitude) y in the second direction (y-direction) and Coriolis force Fc, respectively. Given that the weight m of the dead weights 2, 3, the drive angular frequency ωx (since the frequency can be found by dividing by 2π, the drive angular frequency and drive frequency are used together) and the applied angular velocity Ω are all constant, the Coriolis force Fc and the detection amplitude y, which are converted into sensor outputs, are found by a function of the drive amplitude X alone. Therefore, in order to maintain the uniform sensitivity of the sensor and ensure the reliability of the sensor even when ambient pressure fluctuates or vibration disturbance occurs, constant monitoring of the drive amplitude X and feedback control are required to stabilize the drive amplitude X (AGC: Auto Gain Control).

[Expression 1]

$$Fc = 2 \cdot m \cdot \Omega \cdot X \cdot \omega x \cdot \cos(\omega x \cdot t) \quad (1)$$

where:
Fc: Coriolis force
m: weight of dead weight
Ω: applied angular velocity
X: maximum amplitude in the first direction
ωx/2π: drive frequency
t: time.

[Expression 2]

$$y = Fc \cdot Qy / ky \quad (2)$$

where:
y: detection amplitude
Qy: mechanical quality factor in the detecting direction (y-direction)
ky: spring constant of the supporting beam 5 in y-direction In the angular rate sensor S1 according to the present embodiment, the drive amplitude X is monitored by detecting electrostatic capacitance change of a drive amplitude monitoring electrode 11 (C5, C8) arranged on outer sides of the dead weights 2, 3 and a drive amplitude monitoring electrode 12 (C6, C7) arranged on inner sides of the dead weights 2, 3. Referring to FIG. 1 the principle of detection will be described. A carrier signal Vc of a few hundreds kHz is applied to the common electrode 10 and then propagates to the supporting beams 5 and the dead weights 2, 3 and causes charge transfer according to the electrostatic capacitance of the drive amplitude monitoring electrodes 11 (C5, C8), 12 (C6, C7). The signals having passed through the drive amplitude monitoring electrodes 11, 12 are converted by a C/V converting unit 53 into analog voltage signals and then converted by an A/D converting unit 54 into digital signals. These signals are subjected to computations at a differential detecting unit 55. If the drive amplitude X is 0, the initial capacitance values are offset by each other, resulting in that a voltage of 0 is input to a synchronous detecting unit 56. If the dead weights 2, 3 oscillate in anti-phase, the capacitance of the drive amplitude monitoring electrode 11 (C5, C8) increases, while the capacitance of the drive amplitude monitoring electrode 12 (C6, C7) decreases, and vice versa, to track the drive amplitude X of the dead weights 2, 3. Therefore, the differential detecting unit 55 outputs a signal in proportion to the anti-phase drive amplitude X.

This output signal is converted by the synchronous detecting unit 56 into a drive frequency component (a few tens kHz in Embodiment 1) and a low frequency component containing DC if necessary (a few hundreds Hz from DC in Embodiment 1). The drive amplitude X converted into the low frequency digital signal is input to an AGC 52 that compares the amplitude X with a preset target value of drive amplitude. Based on the comparison result, a D/A converting unit 67 adjusts the amplitude of the driving signal Vd. In this manner, constant feedback control is performed so as to attain the preset target value of drive amplitude X.

The angular rate sensor S1 according to the present embodiment is characterized in that the drive amplitude monitoring electrodes whose electrostatic capacitance changes in the same direction (in a decreasing direction and in an increasing direction when the two dead weights 2 and 3 oscillate in anti-phase in the first direction are electrically connected with each other before the C/V converting unit. Specifically, in the case of the drive amplitude monitoring electrode 11 including the electrodes C5, C8 that form a capacitance with the deadweights 2, 3, the electrodes C5, C8 are electrically connected with each other before the C/V converting unit 53. In the case of the drive amplitude monitoring electrode 12 including the electrodes C6, C7 that form a capacitance with the deadweights 2, 3, the electrodes C6, C7 are electrically connected with each other before the C/V converting unit 53 in the same way as the drive amplitude monitoring electrode 11.

Such a structure of the electrodes can obtain an output in proportion to the anti-phase vibration amplitude at the differential detecting unit 55 when the dead weights 2, 3 oscillate in anti-phase. On the other hand, since the increase in the capacitance of C5 and C7 decreases the capacitance of C6 and C8 while the deadweights 2, 3 are oscillating in phase, the drive amplitude monitoring electrode 11 having the total capacitance of C5 and C8 and the drive amplitude monitoring electrode 12 having the total capacitance of C6 and C7 do not change in capacitance. Consequently, the electrodes sense only the anti-phase vibration, but do not react to the in-phase vibration. Although FIG. 1 shows the drive amplitude monitoring electrodes 11, 12 arranged in a parallel flat plate structure for convenience, the electrodes 11, 12 can be formed in a comb finger structure that can reduce non-linear behavior (ratio between capacitance change and drive amplitude) which is seen in the parallel flat plate structure.

In addition, since the in-phase vibration component is offset before being input to the C/V converting unit 53, even when a large in-phase vibration component occurs, the C/V converting unit 53 and the A/D converting unit 54 are not saturated, thereby maintaining the functions as a sensor.

Since the cancelation of the in-phase vibration component before input avoids saturation of the C/V converting unit 53 and A/D converting unit 54, the converting units do not need to be designed to have an unnecessarily wide conversion range to deal with unknown vibration disturbance, thereby enabling high resolution displacement measurement. For example, conventional methods for removing in-phase vibration disturbance by a differential detecting unit after C/V conversion, converting units need to have a conversion range to convert vibration equivalent to vibration disturbance (e.g., 10 G or more). However, for example, a vehicle's antiskid brake systems are required to detect displacement of a few nm or less by C/V conversion and A/D conversion, the displacement converted into acceleration being approximately 2 G to 5 G. Therefore, designing the converting units to have a conversion range of 10 G or more deteriorates the resolution, resulting in reduction in the accuracy of the sensor. In addition, unexpected vibration disturbance is often created according to ambient environments, including system operation conditions and road surface conditions, in which the sensor is applied. The sensor according to the present embodiment, therefore, can operate effectively, when vibration disturbance near the sensor is measured by an accelerometer with a bandwidth of 50 kHz at a sampling rate of 100 kHz and the measured value exceeds 10 G, or when it is impossible to estimate the amplitude of vibration disturbance due to changes of the ambient environment, such as road surface conditions and system operational conditions.

Furthermore, the angular rate sensor S1 according to the present embodiment forms a tuning fork structure by connecting the two dead weights 2, 3 with the linking beam 7. In addition, the drive vibration system is designed so that the lowest mode frequency (reference mode frequency or a primary mode frequency) becomes an in-phase vibration mode frequency and the next vibration mode frequency becomes an anti-phase vibration mode frequency used to drive the sensor. Because of this, vibration disturbance, which is propagated from a sensor installation environment having mainly lower frequency components than the primary mode frequency, is converted as an in-phase vibration frequency and is canceled out by the drive amplitude monitoring electrodes 11, 12 as described above. Consequently, a robust (strong) sensor against vibration disturbance can be provided.

Although not shown in the drawings, the sensor may be combined with a physical vibration damping device, such as a vibration-proof structure characteristically not effective to damp low-frequency vibrations, but effective to damp high-frequency vibrations. The combination allows the vibration damping device to remove high-frequency vibration disturbance components and the drive amplitude monitoring electrodes 11, 12 to offset low-frequency vibration disturbance components, thereby providing a more robust (stronger) sensor against vibration disturbance.

Upon application of an angular velocity Q about z-axis to the dead weights 2, 3 oscillating in anti-phase, Coriolis force Fc in the second direction, as defined by Expression 1, is generated in the dead weights 2, 3, and then oscillation y in the second direction (y-direction) in proportion to the applied angular velocity Ω is also generated. Since the dead weights 2, 3 oscillate in anti-phase, the vibration in the y-direction also is in anti-phase. The vibration amplitude y of respective deadweights 2, 3 in y-direction is output by converting the capacitance changes of detecting electrodes C9, C10, C11, C12 into electrical signals by C/V converting units 57, 61, A/D converting units 58, 62, differential detecting units 59, 63, and synchronous detecting units 60, 64 and subjecting the converted signals to signal processing at a processing unit 65 and a LPF (low-pass filter) 66.

Since the dead weights 2, 3 move by a large amount in the direction (x-direction) in which the dead weights 2, 3 oscillate in anti-phase, the sensor detects only angular velocity in x-direction; however, the sensor can detect acceleration, in addition to the angular velocity, in y-direction, because the dead weights 2, 3 move by a small amount in the y-direction.

The angular rate sensor according to Embodiment 1 is sealed with a plastic PKG, a ceramic PKG, or a wafer-level PKG to keep out dust and contamination from outside, and then the sensor is installed in a vehicle, a robot, a cellular phone or the like. A packaging example will be described in detail with another embodiment.

As described above, electrically connecting the electrodes arranged on outer sides of the anti-phase oscillating dead weights and electrically connecting the electrodes arranged on inner sides of the anti-phase oscillating dead weights cancel out the in-phase vibration components before the C/V converting unit, and therefore the C/V converting unit and the A/D converting unit are not saturated, thereby maintaining the functions as a sensor. This structure enables provision of a high-performance inertial sensor that can maintain a SNR even in an environment where vibration disturbance exists.

Embodiment 2

Figure 3:
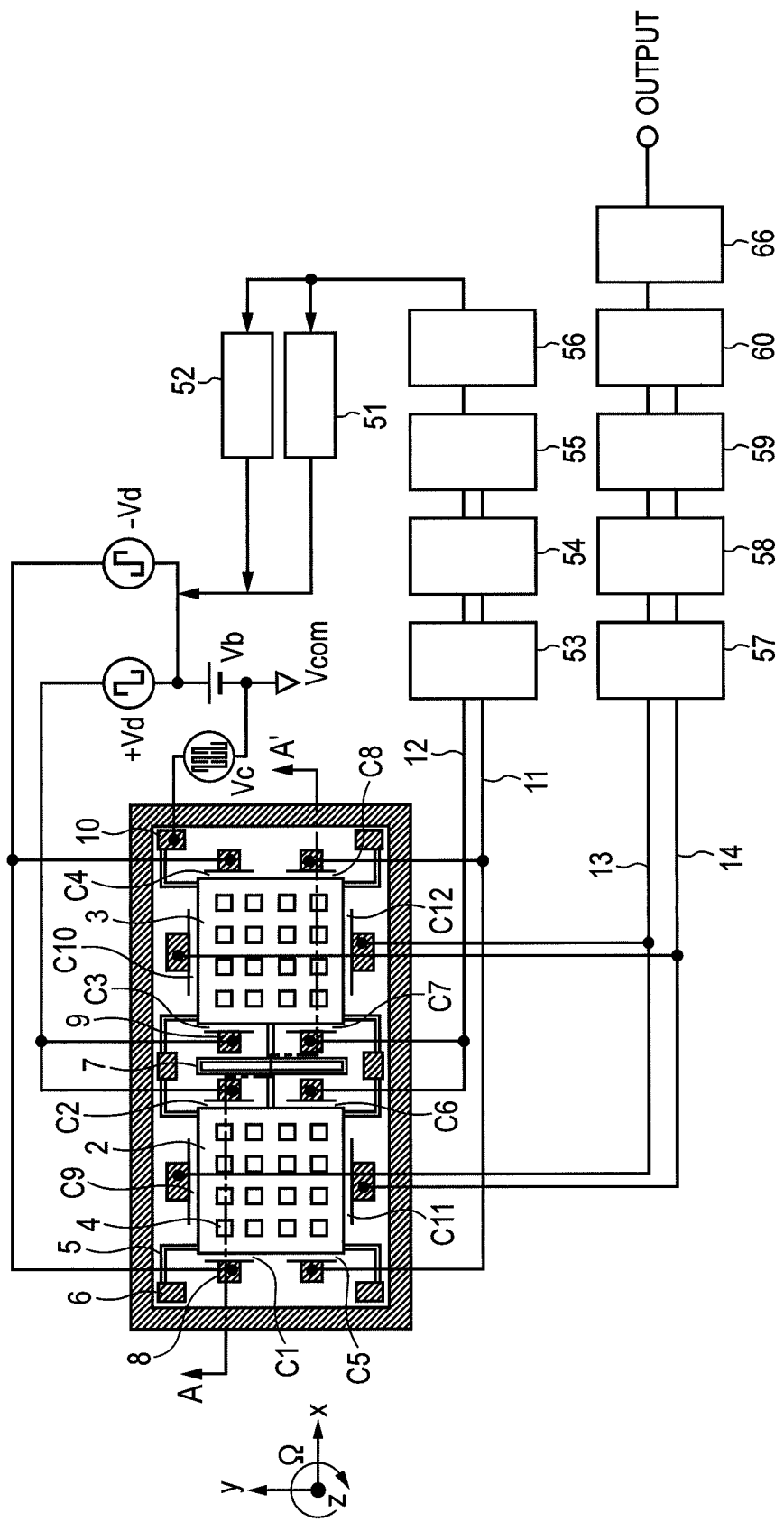
FIG. 3 is a schematic diagram showing the entire configuration of the inertial sensor (angular rate sensor) according to Embodiment 2.

Embodiment 2 will be described with reference to FIG. 3. The matter described in Embodiment 1, but not described in Embodiment 2 can be applied to Embodiment 2 unless there are specific reasons. FIG. 3 is a schematic plan view of main components of the angular rate sensor S2 according to Embodiment 2.

The angular rate sensor S2 according to Embodiment 2 can be fabricated in the same method as that for fabricating the angular rate sensor S1 of Embodiment 1; however, the angular rate sensor S2 is different from Embodiment 1 in the structure. In Embodiment 2, the detecting electrodes whose electrostatic capacitance changes in the same direction (in a decreasing direction and in an increasing direction when the dead weights 2, 3 are displaced in anti-phase in the second direction are also electrically connected with each other before the C/V converting unit.

With reference to FIG. 3, the configuration of the angular rate sensor S2 according to Embodiment 2 will be described with emphasis on the modified or added portions, but portions overlapping with the content of Embodiment 1 are omitted.

Upon application of an angular velocity Q about the z-axis to the dead weights 2, 3 oscillating in anti-phase, Coriolis force Fc in the second direction, defined by Expression 1, is generated in the dead weights 2, 3, and then oscillation y in the second direction (y-direction) in proportion to the applied angular velocity Ω is also generated. Since the dead weights 2, 3 oscillate in anti-phase in the first direction, the oscillation y in the y-direction also is in anti-phase.

The angular rate sensor S2 according to the present embodiment includes detecting electrodes C9 and C12 whose electrostatic capacitance changes in the same direction (in a decreasing direction and in an increasing direction when the two dead weights 2, 3 oscillate in anti-phase in the second direction and detecting electrodes C10 and C11 whose electrostatic capacitance changes in the same direction (in a decreasing direction and in an increasing direction when the two dead weights 2, 3 oscillate in anti-phase in the second direction, the detecting electrodes C9, C12 being electrically connected with each other and the detecting electrodes C10, C11 being electrically connected with each other before the C/V converting unit 57.

Such a structure of the electrodes can obtain an output in proportion to the anti-phase vibration amplitude at the differential detecting unit 59 when the dead weights 2, 3 oscillate in the second direction in anti-phase. On the other hand, since the increase in the capacitance of C9, C10 decreases the capacitance of C11, C12 while the dead weights 2, 3 are oscillating in phase, the detecting electrode 13 having the total capacitance of C9 and C12 and the detecting electrode 14 having the total capacitance of C10 and C11 do not change in capacitance. Consequently, the electrodes sense only the anti-phase vibration, but do not react to the in-phase vibration. Although FIG. 3 shows the detecting electrodes 13, 14 arranged in a parallel flat plate structure for convenience, the detecting electrodes 13, 14 can be formed in a comb finger structure that can reduce non-linear behavior (correlation between capacitance change and drive amplitude) which is seen in the parallel flat plate structure.

In addition, since the in-phase vibration components are offset before being input to the C/V converting unit 57, even when a large in-phase vibration component occurs in the y-direction, the C/V converting unit 57 and the A/D converting unit 58 are not saturated, thereby maintaining the functions as a sensor.

Especially, the angular rate sensor S2 of Embodiment 2 forms a tuning fork structure also in the second direction by connecting the two dead weights 2, 3 with the linking beam 7. In addition, the detecting vibration system including the dead weights 2, 3, the supporting beams 5 and the linking beam 7 is designed so that the lowest mode frequency (primary mode frequency) becomes an in-phase vibration mode along the second direction and the next vibration mode frequency becomes an anti-phase vibration mode.

Because of this, vibration disturbance propagated from a sensor installation environment including mainly lower frequency components than the primary mode frequency is converted as an in-phase vibration frequency and is cancelled out by the detecting electrodes 13, 14. Consequently, the angular rate sensor S2 according to Embodiment 2 can remove the in-phase vibration disturbance components in both the first direction and second direction, thereby providing a robust (strong) sensor against vibration disturbance.

Although not shown in the drawings, the sensor may be combined with a physical vibration damping device, such as a vibration-proof structure characteristically not effective to damp low-frequency vibrations, but effective to damp high-frequency vibrations. The combination allows the vibration damping device to remove high-frequency vibration disturbance components and the angular rate sensor S2 of Embodiment 2 to offset low-frequency vibration disturbance components, thereby providing a more robust (stronger) sensor against vibration disturbance.

The capacitance change of the detecting electrodes 13, 14 are converted by the C/V converting unit 57, A/D converting unit 58, differential detecting unit 59, and synchronous detecting unit 60 into an electrical signal that is then output via the LPF (low-pass filter) 66.

As described above, Embodiment 2 can provide a high-performance inertial sensor that can maintain a SNR even in an environment where vibration disturbance exists. In addition, electrically connecting the detecting electrodes whose electrostatic capacitance changes in the same manner when the two dead weights oscillate in anti-phase in the second direction (y-direction) before the C/V converting unit can cancel out the in-phase vibration components not only in the first direction (x-direction), but also in the second direction (y-direction), thereby achieving a stronger sensor against vibration disturbance.

Embodiment 3

Figure 4:
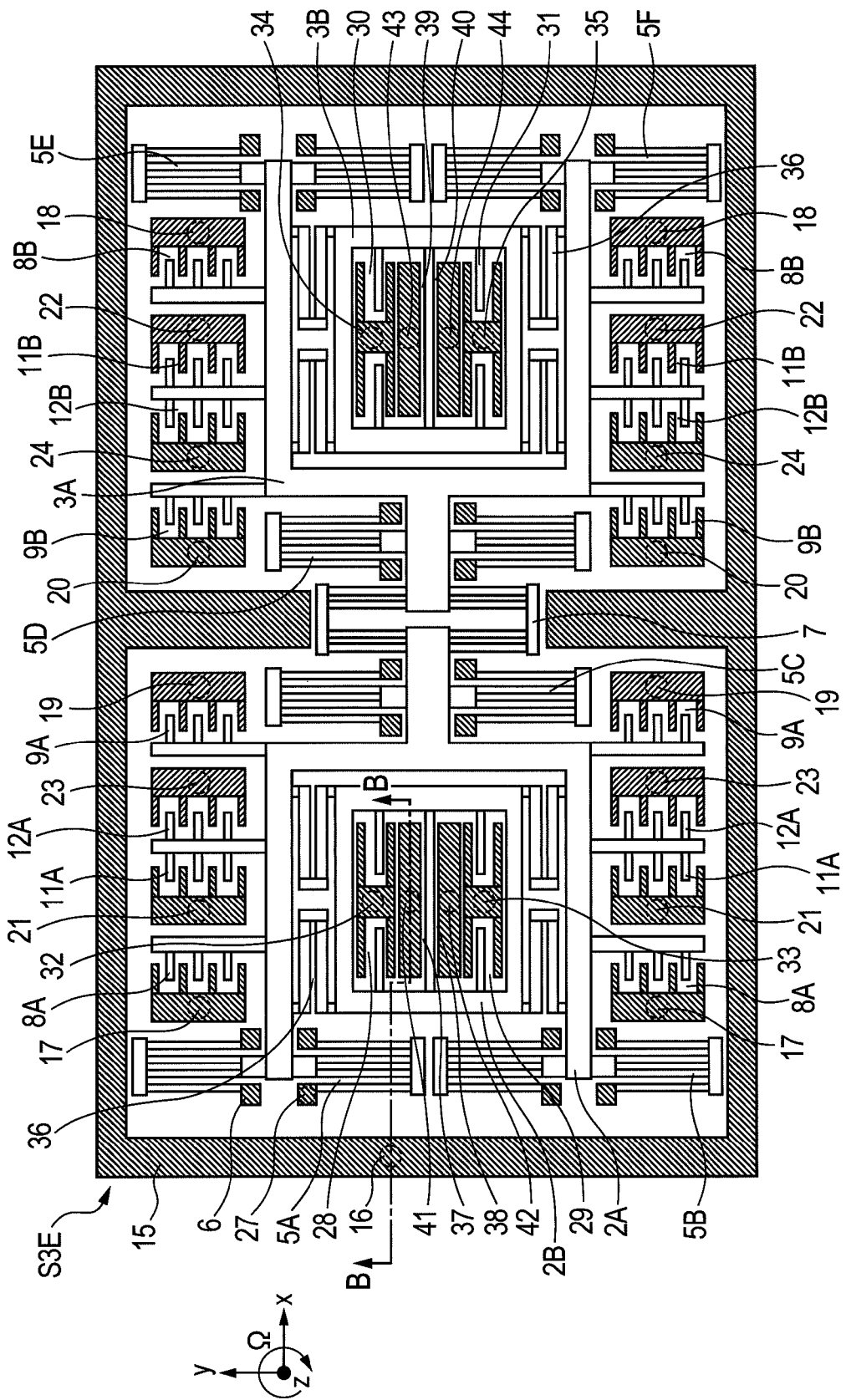
FIG. 4 is a schematic diagram showing the entire configuration of the inertial sensor (angular rate sensor) according to Embodiment 3.
Figure 5:
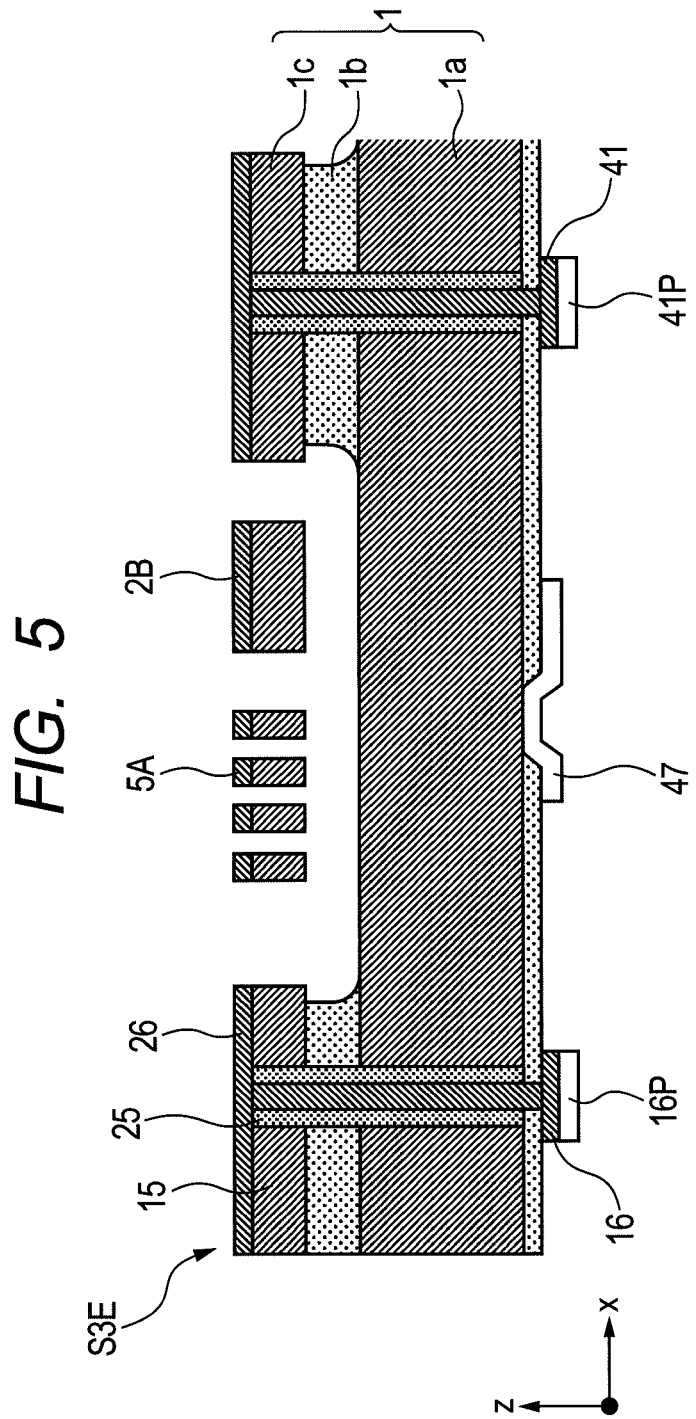
FIG. 5 is a cross-sectional view taken along the line B-B' in FIG. 4.
Figure 6:
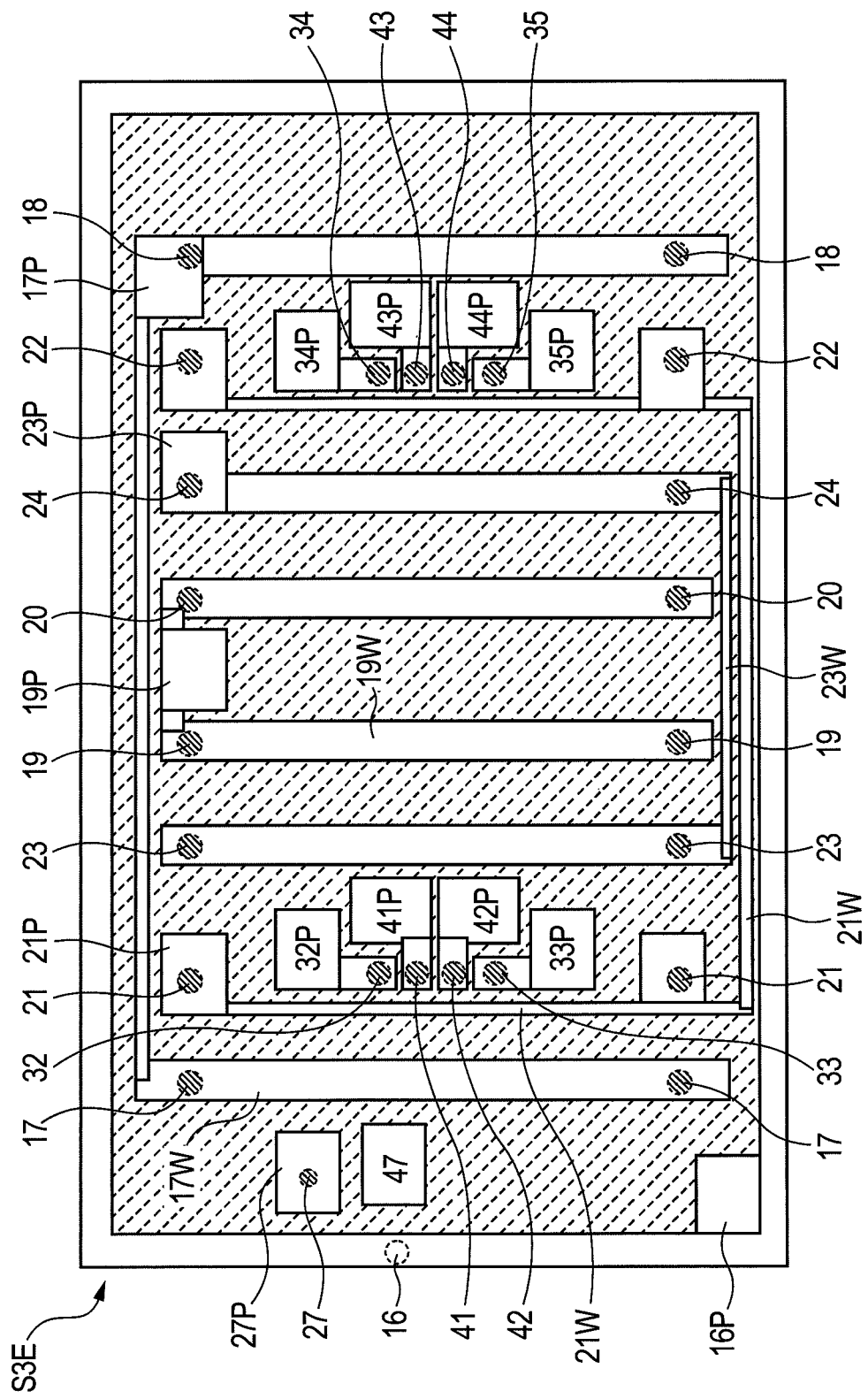
FIG. 6 is a wiring diagram of the back surface of the angular rate sensor of FIG. 4.

Embodiment 3 will be described by referring to FIGS. 4 to 9. The matter described in Embodiment 1 or 2, but not described in Embodiment 3 can be applied to Embodiment 3 unless there are specific reasons. FIG. 4 is a schematic plan view showing main components of an angular rate sensor S3 according to Embodiment 3. FIG. 5 is an enlarged view of a cross-section taken along the line B-B'. FIG. 6 is a wiring diagram of the back side of the angular rate sensor in FIG. 4.

With reference to FIGS. 4 to 9, the configuration and the fabrication method of the angular rate sensor S3 according to Embodiment 3 will be described with emphasis on the modified or added portions, but portions overlapping with the content of Embodiments 1 and 2 are omitted.

As shown in FIGS. 4 and 5, a base 15, which will be bonded with a cap 100 as described later, is formed by patterning the conductive layer 1c. This base 15 is configured to receive electrical signals from the supporting substrate 1a side via a well-known through via 16 or to maintain at a fixed potential. The through via 16 is formed by, after making a through hole in the supporting substrate 1a, insulating interlayer 1b and conductive layer 1c, subjecting the through hole to thermal oxidation to form an insulating film 25 around the through hole. Then, the insulating film 25 formed on the surface of the conductive layer 1c is removed by CMP (Chemical Mechanical Polishing) or plasma etching, and the through hole is filled with polysilicon 26 by CVD (Chemical Vapor Deposition). The filling process of polysilicon 26 can be divided into two steps so that conductive impurities are implanted in the polysilicon 26 through thermal diffusion after the first filling step in order to reduce the electric resistance of the polysilicon 26. The use of the through via allows electrical signals to be input and output to the components formed on the conductive layer 1c from the side of the supporting substrate 1a. Even if the cap 100 is bonded on the base 15 by anodic bonding with glass or other types of adhesive, signal communication with external devices can be made readily. The reference numerals 16P, 41P denote pads.

A fixed potential applied to the supporting substrate 1a via a substrate electrode 47 prevents the supporting substrate 1a from being charged due to external electromagnetic noise and blocks signal propagation caused by capacitive coupling.

In an area surrounded by the base 15, anchors 6 are fixed on the supporting substrate 1a with the interlayer 1b and are connected to supporting beams 5A, 5B, 5C, 5D, 5E, 5F that support driven elements 2A, 3A, which will be described later. The anchors 6 also have through vias 27 formed therein and are applied with carrier Vc from a control LSI 50, which will be described later, via a pad 27P and the through vias 27.

FIG. 6 shows a wiring layout arranged on the surface of the supporting substrate 1a. In Embodiment 3, the through vias are coupled as necessary by using the wiring pattern shown in FIG. 6. In Embodiment 3, through vias 17, 18 that supply driving signals to driving electrodes 8A, 8B arranged on the outer side of the driven elements 2A, 3A are coupled with a wire 17W. A driving signal from the control LSI 50 as described below is applied to the driving electrodes 8A, 8B via a pad 17P. A driving signal is also applied to the driving electrodes 9A, 9B arranged on the inner side of the driven elements 2A, 3A, as with the case of the electrodes arranged on the outer side, via a pad 19P from the through vias 19, 20 coupled with a wire 19W.

As with the driving electrodes, monitoring electrodes 11A, 11B and monitoring electrodes 12A, 12B are coupled with wires 21W and 23W, respectively, and are connected to the control LSI 50 via the respective pads 21P, 23P by a means, such as wire bonding and solder ball. The reference numerals 32P, 33P, 34P, 35P, 42P, 43P, 44P denote pads.

The electrodes, such as the driving electrodes 8A, 8B, 9A, 9B, formed in the conductive layer 1c are taken out to the supporting substrate 1a by using the through vias, and the electrodes can be connected as needed by using the wiring layer formed on the surface of the supporting substrate 1a. This method allows the electrodes to be connected within a single substrate 1, and therefore can make the sensor compact compared with the sensor made by other means like wire bonding. In addition, the sensor can be fabricated by semiconductor batch processing, such as photolithography, which provides high yields and ensures high reliability because the wires fabricated by the processing do not swing by external vibrations and do not lean on the other components, in addition, such steady wires do not cause wire-substrate parasitic capacitance change that fluctuates or destabilizes the sensor characteristics.

Each of the supporting beams 5A to 5F includes at least two fixed-side beams, a free beam and at least two support-side beams. The fixed-side beams extend along the second direction orthogonal to the first direction so as to oppose to each other, are flexible in the first direction (x-direction), or in the driven direction, but are stiff in the second direction (y-direction), or in the detecting direction, have one end connected to an anchors 6, and are symmetrically arranged with respect to the y-direction. The free beam extends at the other end of the fixed-side beams in the x-direction and is hard to be deformed in both the x-axis and y-axis directions. The support-side beams extend from the free beam in parallel with the fixed-side beams with a predetermined space therebetween, are flexible in the driven direction (x-direction), but are stiff in the detecting direction (y-direction), have one end connected to the free beam and the other end connected to the driven element 2A or 3A, and are symmetrically arranged with respect to the y-direction.

The supporting beams 5A to 5F form a drive vibration system with the driven elements 2A, 3A and the linking beam 7. In the drive vibration system, the supporting beams 5A to 5F and the linking beam 7 function as springs, while movable portions, or the driven elements 2A, 3A, function as dead weights, and the natural frequency ωx of the drive vibration system is defined as $(k_x/m)^{1/2}$. The spring constant kx of the supporting beams 5A to 5F in the x-direction is determined by a function of the shape of the supporting beams 5A to 5F, Young's modulus of the component's material and so on. Note that the Young's modulus of the component's material is a value of the physical property inherent to the material, but the apparent value thereof changes depending on the internal stress of the material.

Figure 7A:
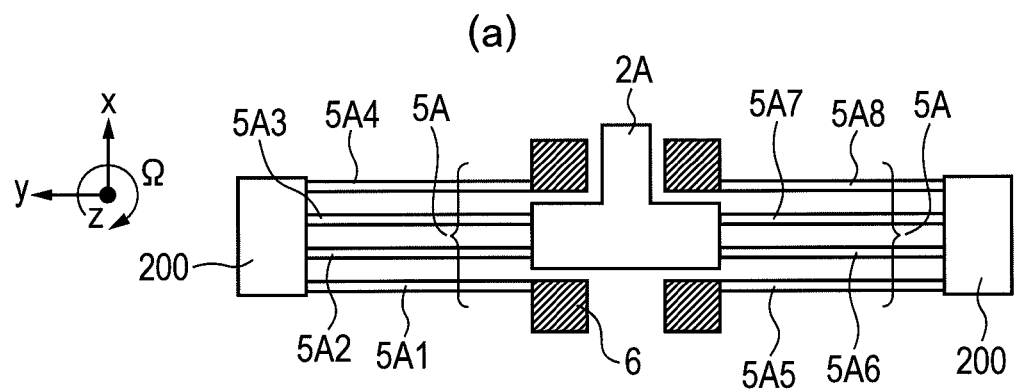
FIG. 7A is a schematic view for explaining the stiffness in z-direction of a supporting beam of the angular rate sensor according to Embodiment 3: (a) is a plan view; (b) is a side view before deformation; and (c) is a side view after deformation.
Figure 7A:
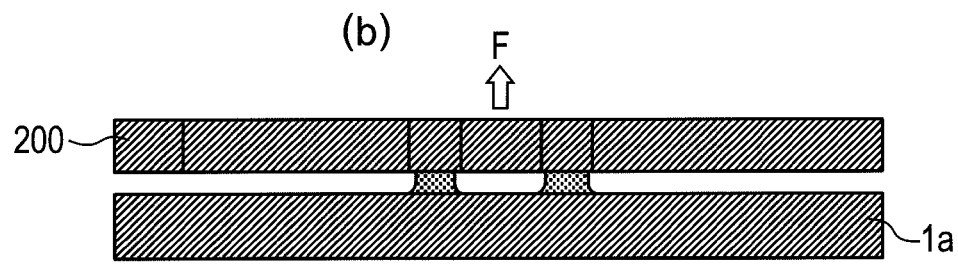
Figure 7A:
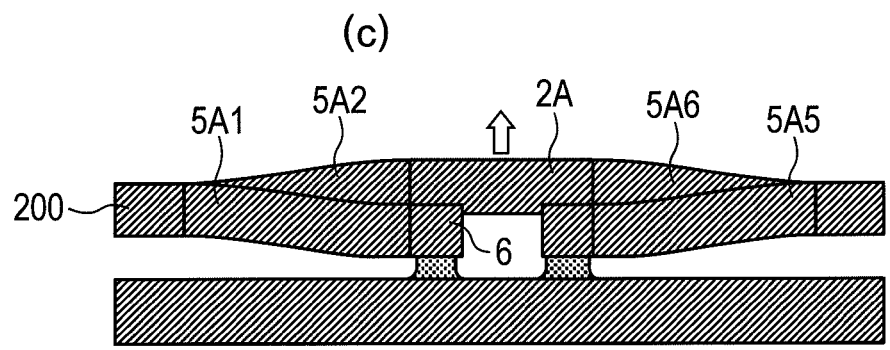

The internal stress of the supporting beam 5A undergoes a finite element analysis. FIG. 7A (a) shows the specific configuration of the supporting beam 5A. First, analysis conditions will be described, and the effectiveness in using the supporting beam 5A will be described later.

As shown in FIG. 5, the angular rate sensor S3 according to Embodiment 3 uses the SOI substrate 1 fabricated by laminating different kinds of materials. A sealing cap 100, which will be described later, is bonded on the base 15 and a sensor element S3E is mounted on an LSI 50 as shown in a packaging diagram of FIG. 9, and further is placed on a PKG 150. In other words, the angular rate sensor S3 is a laminated structure composed of multiple kinds of materials having different linear expansion coefficients. When the sensor having the laminated structure is used in a place where the temperature changes significantly, such as an engine compartment of a car, the PKG 150, the LSI 50 and the SOI substrate 1 are deformed due to the difference in the linear expansion coefficient of the materials, resulting in displacement of the anchors 6.

According to a theory of mechanics of materials, temperature fluctuations and linear expansion coefficient difference deforms the sensor element S3E so as to have a uniform curvature. Therefore, all the four anchors 6 connected with the supporting beam 5A radially move away from or closer to the center of the sensor element S3E. With the finite element analysis, obtained is the principal stress distribution of the supporting beam 5A in the y-direction when the anchors 6 have moved about 1 μm away from the center of the sensor element S3E.

The reason why the y-direction principal stress component is focused is as described below. When the anchors 6 have radially moved with respect to the center of the sensor, the displacements in the x-direction are absorbed by the deformed supporting beam 5A and therefore internal stress is not generated. On the other hand, since the displacement in the y-direction stretches or compresses the supporting beam 5A in the length direction, the supporting beam 5A made stiff in the y-direction generates internal compressive stress or tensile stress in the y-direction. Especially, the internal stress in the y-direction affects the spring constant kx in the x-direction of the supporting beam 5A, and therefore the anti-phase vibration mode frequency ωx and Coriolis force Fc in Expression 1 are changed, in other words, the internal stress in the y-direction affects the sensitivity of the sensor. This is the reason why the y-direction principal stress is focused on and analyzed.

The analysis results show that internal stresses are generated in the four fixed-side beams (5A1, 5A4, 5A5, 5A8) connected with the anchors 6 and the four support-side beams (5A2, 5A3, 5A6, 5A7) connected with the driven element 2A so as to cancel out the internal stresses caused by positional fluctuations of the anchors 6, large tensile stresses are imposed on the supporting beams 5A3, 5A6, and a large compressive stresses are imposed on the supporting beams 5A2, 5A7, but stresses imposed on the other supporting beams are small. Especially, it has been found that the compressive stress on the supporting beam 5A2 and the tensile stress on the supporting beam 5A6 are large at their ends connected with the driven element 2A, while the tensile stress on the supporting beam 5A3 and the compressive stress on the supporting beam 5A7 are large at their ends connected with the free beam 200. Consequently, the internal stress of the supporting beam 5A resulting from deformation and distortion of the SOI substrate 1 or the like is canceled out between the components making up the supporting beam 5A, and therefore fluctuations in spring constant kx of the supporting beam 5A can be suppressed. This can reduce the fluctuations in natural frequency ωx of the drive vibration system and deterioration in linearity of the ratio between drive amplitude and driving signals Vd caused by the internal stress.

The sensor capable of suppressing the fluctuations in the natural frequency ωx of the drive vibration system in an environment where temperature changes in a wide range does not require the LSI 50 to perform advanced temperature compensation, thereby achieving highly-reliable sensing performance, miniaturization of the LSI, and cost reduction due to simplification of temperature compensation before shipment.

In addition, the fixed-side beams and the support-side beams making up the supporting beams 5A to 5F are folded beams that are supported on both ends and have a width of a few μm and a length of a few hundreds to a thousand μm so as to be flexible in the driven direction (x-direction), but the fixed-side beams and the support-side beams are made of the conductive layer is of a few tens μm in thickness and are symmetrically arranged as if the driven element 2A is caught by the anchors 6 so as to be stiff in the detecting direction (y-direction) and the out-of-plane direction (z-direction). This structure enables the primary natural mode of the drive vibration system to be an in-phase vibration mode in the first direction (x-direction, driven direction) and the secondary natural mode to be an anti-phase vibration mode.

Figure 7B:
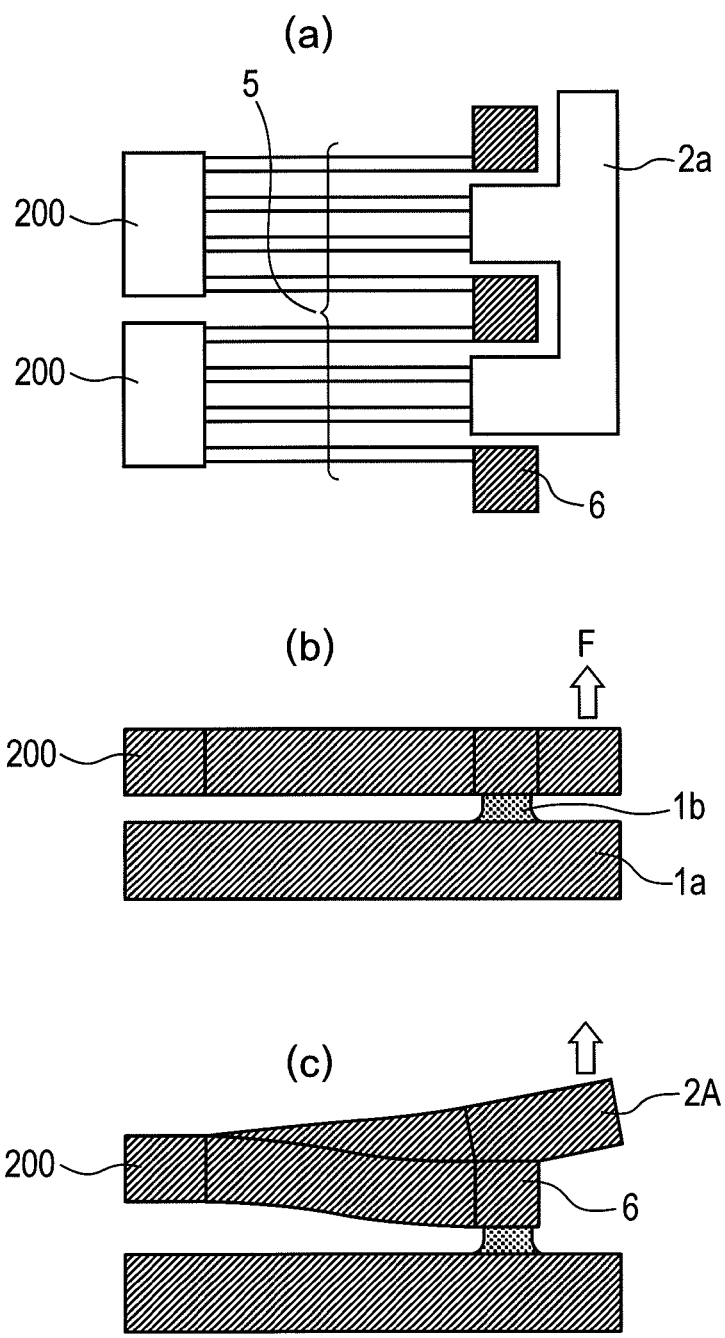
FIG. 7B is a schematic view for explaining the stiffness in z-direction of a supporting beam in the angular rate sensor according to a comparative example: (a) is a plan view; (b) is a side view before deformation; and (c) is a side view after deformation.

FIGS. 7A(a), 7A(b), 7A(c) and FIGS. 7B(a), 7B(b), 7B(c) are schematic diagrams to explain that the use of the symmetrically-arranged type supporting beams 5A to 5F can increase the spring constant kz in the out-of-plane direction (z-direction), in other words, can improve the stiffness in z-direction. FIGS. 7A(a), 7A(b), 7A(c) show the symmetrically-arranged type supporting beam 5A and how the supporting beam 5A and the driven element 2A deform when external force F in z-direction is applied to the supporting beam 5A, while FIGS. 7B(a), 7B(b), 7B(c) show a comparative example in which an asymmetrically-arranged type supporting beam is employed and how the supporting beam and the driven element 2A deform. FIG. 7A(a) and FIG. 7B(a) are plan views, FIG. 7A(b) and FIG. 7B(b) are side views before deformation, and FIG. 7A(c) and FIG. 7B(c) are side views after deformation.

First, (1) in the symmetrically-arranged type supporting beam, the anchors 6 are symmetrically arranged about the driven element 2A so as to sandwich the driven element 2. The fixed-side beams 5A1, 5A4, 5A5, 5A8 are formed from the anchors 6 so as to extend away from the driven element 2A and folded at the respective free beams, and then the support-side beams 5A2, 5A3, 5A6, 5A7 are arranged to connect with the driven element 2A. To displace the driven element 2A, which is supported/restrained at both ends by the supporting beam 5A, by external force F in z-direction to move away from or closer to the supporting substrate 1a, as shown in FIG. 7A(c), the fixed-side beams and support-side beams making up the supporting beam 5A are to be deformed in the shape of cubic curve, like a letter 'S'. The external force F is absorbed by internal extension and compression of the supporting beam 5A, and the displacement of the driven element 2A in z-direction is smaller than the case using asymmetrically-arranged type supporting beams as described later. For the spring constant kz of the supporting beam 5A in z-direction defined by Expression 3, the spring constant kz varies inversely as the displacement z in z-direction to the external force F, which proves that the spring constant is larger than that of the asymmetrically-arranged type supporting beam structure as described later.

[Expression 3]

$$kz = F/z \quad (3)$$

where:
kz: stiffness of supporting beam 5A in z-direction
F: external force in z-direction
z: displacement of driven element 2A in z-direction Although the asymmetrically-arranged type supporting beam shown in FIG. 7B(a) is obvious and therefore is not described in detail, the asymmetrically-arranged type supporting beam has the similar spring constants kx, ky in the x-direction and y-direction to the symmetrically-arranged type supporting beam. However, the asymmetrically-arranged type supporting beam holds the driven element 2A with one end as if the supporting beam is a cantilever beam, therefore the displacement z of the driven element 2A in z-direction against the external force F becomes relatively large, but the spring constant kz becomes relatively small.

Another effect obtained by the symmetrically-arranged type supporting beams 5A to 5F is that the driven element 2A supported at both ends moves in z-direction while maintaining itself in parallel with supporting substrate 1a against the external force F in the x direction. Although the details will be described later, in the case of the drive amplitude monitoring electrodes 11, 12 and the detecting electrodes 13, 14 that detect the displacements of the driven elements 2A, 3A and Coriolis elements 2B, 3B in the x-direction and y-direction as capacitance changes, differential detection of respective values of the electrodes is performed to offset the in-phase components and output only the anti-phase components. If the driven element 2A is translated in the z-direction, the capacitance change of the drive amplitude monitoring electrodes 11, 12 and the detecting electrodes 13, 14 with the translation of the driven element 2A appears as in-phase components that are cancelled out upon differential detection. Thus, a more robust (stronger) sensor against vibration disturbance in z-direction can be provided.

The driven elements 2A and 3A are supported by the supporting beams 5A to 5F that are flexible in the x-direction, which is the driven direction and are hard in the y-direction and the z-direction and suspended above the supporting substrate 1a. Although omitted in the drawings, holes 4 are formed in the driven elements 2A, 3A, which are relatively wider than the other movable portions including beams, and Coriolis elements 2B, 3B, which will be described later, to facilitate removal of the insulating interlayer 1b as with the case of Embodiments 1 and 2.

The driven elements 2A, 3A are shaped into an open loop, like a letter 'Y'. The symmetrically-arranged type supporting beams 5A to 5F are placed at the three ends of the 'Y' shaped driven elements. According to such a structure and arrangement, even when the substrate 1 is deformed or distorted due to temperature fluctuations, the driven elements 2A, 3A are deformed to absorb the deformation of the substrate 1, thereby providing an angular rate sensor usable in a wide temperature range without breakage of the supporting beams 5A to 5F and the driven elements 2A, 3A.

The specific mechanism and available effects will be described with reference to FIG. 4. First, supporting beams 5C and 5D are arranged in a center part of the sensor element S3E. Even though the SOI substrate 1 deforms due to temperature fluctuations, the distance in which the supporting beams 5C and 5D move is infinitesimal because the anchors 6 connected to the supporting beams 5C and 5D are arranged close to one another, and therefore large stress does not occur in the supporting beam 5C, 5D. However, since the anchors 6 of the supporting beams 5A, 5B, 5E, 5F are arranged relatively far away from the centers of the sensor element S3E, the supporting beams 5A, 5B, 5E, 5F move a relatively large distance, and therefore relatively large internal stress occurs in the supporting beams 5A, 5B, 5E, 5F. As described above, since the supporting beams 5A to 5F have a symmetrical structure, the generated internal stresses are offset in the respective supporting beams. However, if the internal stress exceeds a yield stress of the fixed-side beams and the support-side beams making up the respective supporting beams 5A to 5F, beam breakage occurs. To prevent breakage, the angular rate sensor S3 of Embodiment 3 employs the 'Y' shaped driven elements 2A, 3A whose ends are supported by the supporting beams 5A to 5F that deform the driven elements 2A, 3A with deformation of the substrate 1 to absorb the deformation of the substrate 1, thereby achieving a sensor usable in a wide temperature range, for example, from −50 to 150° C.

Furthermore, the placement of the supporting beams 5A to 5F on the ends of the 'Y' shaped driven elements 2A, 3A provides the driven elements 2A, 3A with three support points on their outer circumferences. In comparison with conventional single-point support or two-point support structure, which is reportedly resistant to temperature fluctuations, the driven elements 2A, 3A have increased rotational stiffness in the z-axis direction and about the x-axis, y-axis and z-axis, and natural frequency associated with unwanted modes, such as rotational mode and torsional mode, for the x-axis and y-axis can be separated from a drive/detection mode frequency translating with the x-axis and y-axis. These unwanted modes have different vibration systems from the drive/detection mode and therefore have different temperature characteristics (frequency fluctuation characteristics with temperature fluctuation). If the unwanted modes are contained in a frequency adjacent to the drive/detection frequency, the unwanted mode may cause errors, such as occurrence of a vibration mode at a specific temperature.

In the angular rate sensor S3 according to Embodiment 3, the sensor element S3E achieves, although not limited thereto, an in-phase vibration mode frequency of 10 to 12 kHz, an anti-phase mode frequency and a detection mode frequency of 13 to 18 kHz, and an unwanted mode frequency of 19 kHz or more by supporting the ends of the 'Y' shaped driven elements 2A, 3A with the supporting beams 5A to 5F.

Driving signals Vd applied to the driving electrodes 8A, 8B, 9A, 9B via the through vias 17, 18, 19, 20, respectively, excite the driven elements 2A, 3A in anti-phase mode. Explanation about the driving electrodes 8A and 8B and the driving electrodes 9A and 9B electrically connected with each other as with Embodiments 1, 2 and the driving mechanism has been already given and therefore is not reiterated.

The drive amplitude monitoring electrodes 11A, 11B, 12A, 12B have the through vias 21, 22, 23, 24 formed therein, respectively, as with Embodiments 1, 2, and the drive amplitude monitoring electrodes 11A and 11B and 12A and 12B are electrically connected with each other before the C/V converting unit 53. The basic effects obtained from the structure, the circuit configuration for detecting drive amplitude, and the detection mechanism are the same as those in Embodiments 1, 2.

The angular rate sensor S3 according to Embodiment 3 adopts a comb finger structure for electrodes, such as the driving electrodes 8A, 8B, 9A, 9B and the drive amplitude monitoring electrodes 11A, 11B, 12A, 12B, arranged in a direction (direction extending along y-direction) that impedes driving vibrations (x-direction). From a theory of electromagnetism, the comb finger electrode structure can provide excellent linear ratios between the drive amplitude X and driving signal Vd and between the capacitance change of the drive amplitude monitoring electrode and drive amplitude X in comparison with a parallel plate type electrode structure.

A theory of fluid mechanics indicates that if the electrodes arranged to impede driving vibrations in the x-direction are formed to have the comb finger structure, slide film damping dominantly occurs between a fixed electrode and a movable electrode, and therefore the comb finger structure can damp vibration less than parallel plate type electrodes in which squeeze film damping occurs. In other words, the comb finger structure can achieve a high mechanical quality factor (Value Q) and also achieve large drive amplitude X with a small driving signal Vd if environmental conditions, such as ambient pressure, are the same.

However, when the comb finger electrodes are adopted for the structure with the dead weights 2, 3 movable in the x-direction and the y-direction as shown in the angular rate sensor S1 of Embodiment 1, the capacitance change of the drive amplitude monitoring electrodes caused by vibration disturbance in the x-direction can be offset before the C/V converting unit, but the capacitance change of the monitoring electrodes caused by vibration disturbance in the y-direction is input to the C/V converting unit. The input capacitance may saturate the C/V converting unit depending on the amount of charge, and the saturated C/V converting unit cannot feed proper signals to the AGC and AFC, resulting in possible loss of functions as a sensor.

Since the angular rate sensor S3 according to Embodiment 3 supports the driven elements 2A, 3A with the supporting beams 5A to 5F being stiff in the y-direction, the sensitivity of the drive amplitude monitoring electrodes 11A, 11B, 12A, 12B to vibration disturbance in the y-direction is low. Thus, a robust (strong) sensor against vibration disturbance in both the directions x and y can be achieved while maintaining a high value Q.

Coriolis elements 2B, 3B are connected with the driven elements 2A, 3A with four detection beams 36 that are stiff in the x-axis direction, which is a driven direction, but flexible in the y-axis direction, which is a detecting direction. With this structure, the Coriolis elements 2B, 3B oscillate in the driven direction at the same amplitude and in the same phase as the driven elements 2A, 3A so as to follow the oscillations of the driven elements 2A, 3A in the x-axis direction.

Figure 8:
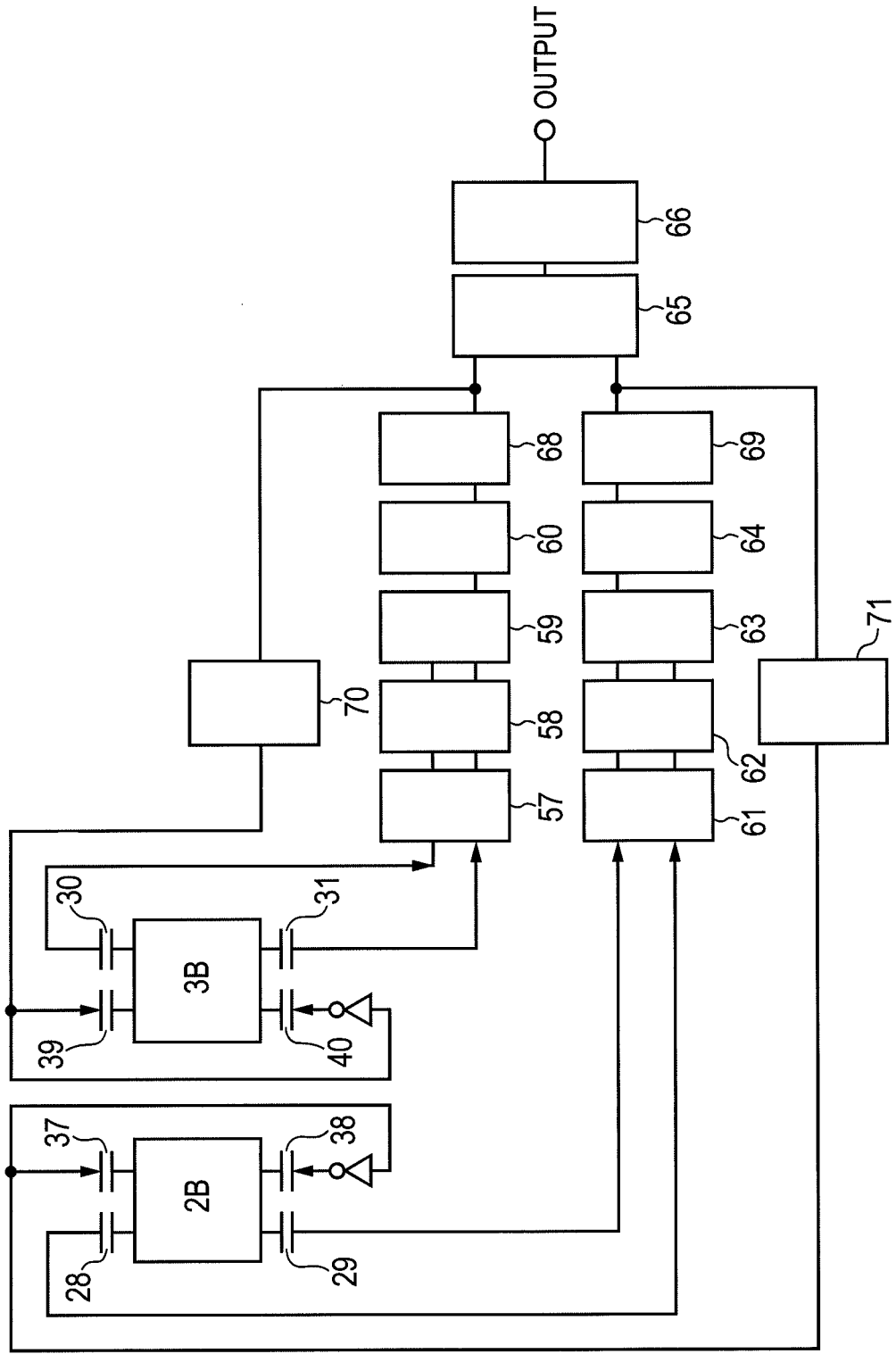
FIG. 8 is a conceptual diagram of a detection/servo circuit in the angular rate sensor according to Embodiment 3.

Detecting electrodes 28, 29, 30, 31 form capacitance with movable electrodes connected with the Coriolis elements 2B, 3B and fixed electrodes fixed to the supporting substrate 1a with the insulating interlayer 1b. The fixed electrodes have through vias 32, 33, 34, 35, respectively, that transfer charges generated in accordance with capacitance change of the detecting electrodes to a detection circuit as will be described later. The detection circuit is shown in FIG. 8 and will be described later.

Servo electrodes 37, 38, 39, 40 form capacitance with movable electrodes connected with the Coriolis elements 2B, 3B and fixed electrodes fixed to the supporting substrate 1a with the insulating interlayer 1b. The fixed electrodes have through vias 41, 42, 43, 44, respectively, that are used to apply voltage to generate electrostatic force Fs that cancels out the Coriolis force Fc, represented by Expression 1, generated in the Coriolis elements 2B, 3B with application of angular velocity Ω. The signal-flow path is shown in FIG. 8 with the detection circuit and will be described later.

Specifically, fixed components including the base 15 formed in the conductive layer 1c, anchors 6, fixed electrodes of the driving electrodes 8, 9, fixed electrodes of the drive amplitude monitoring electrodes 11, 12, fixed detecting electrodes of the detecting electrodes 28, 29, 30, 31, and fixed electrodes of the servo electrodes 37, 38, 39, 40 are fixed on the supporting substrate 1a with the insulating interlayer 1b formed under the conductive layer 1c. The schematic diagram showing the entire configuration of the angular rate sensor S3 in FIG. 4 indicates the fixed components with a hatching pattern.

On the other hand, movable components including the driven elements 2A, 3A, the Coriolis elements 2B, 3B, and beams 5A to 5F, 7, 36 are suspended on the anchors 6 with the underlying insulating interlayer 1b removed. With this structure, the movable components can move in plane of the conductive layer 1c parallel with the main surface of the SOI substrate (supporting substrate 1a).

FIG. 8 shows a detection circuit for detecting the amplitude y of the Coriolis elements 2B, 3B in the detecting direction (y-direction) and a feedback control circuit for cancelling out the Coriolis force Fc with electrostatic force. Displacements y of the Coriolis elements 2B, 3B in the y-direction are detected by converting capacitance changes of the parallel plate type detecting electrodes 28, 29, 30, 31 made with the displacements into electrical signals. Charges generated in proportion to the capacitance of the detecting electrodes 28 to 31 are input to C/V converting units 57, 61 and A/D converting units 58, 62 to be converted into voltage signals and then converted by differential detecting units 59, 63 into signals in proportion to the displacements in the y-direction. Subsequently, the signals are converted by synchronous detecting units 60, 64 into signals having a drive frequency or a frequency lower than the drive frequency. The converted signals are compared with a prescribed value by servo control units 68, 69 that then adjust the amplitude, frequency and phase of the signals so that they can cancel out the Coriolis force Fc generated in the Coriolis elements 2B, 3B. The adjusted signals are input to D/A converting units 70, 71 and a differential processing unit 65. The digital signals input in the D/A converting units 70, 71 are converted into analog voltage signals and input to the respective servo electrodes 37, 38, 39, 40. The Coriolis force Fc generated in the Coriolis elements 2B, 3B with angular velocity Q is offset by electrostatic servo force Fs generated by the servo electrodes 37, 38, 39, 40, and therefore the displacements y of the Coriolis elements 2B, 3B in the y-direction caused by Coriolis force Fc is kept to a minimum.

Since the servo control units 68, 69 adjust the signals to be equivalent to the Coriolis force Fc, the signals from the servo control units 68, 69 are processed by the differential processing unit 65 without preprocessing and then pass through an LPF 66 as a sensor output.

The effects obtained by using servo control include improvement in the output linearity and the robustness against sealing pressure variations. Expression 4 obtains the capacitance difference ΔC between the detecting electrodes 28 and 29 when the Coriolis element 2B is displaced in the y-direction. It is found from the expression that if the displacement yin the detecting direction is used as a sensor output without processing, the sensor output ΔC exhibits nonlinear behavior with increase in the displacement y.

[Expression 4]

$$\Delta C = C_{28} - C_{29} = \varepsilon A \left( \frac{1}{g-y} - \frac{1}{g+y} \right) \quad (4)$$

ε: air permittivity
A: area ratio between fixed electrode and movable electrode of detecting electrodes 28, 29
g: space between fixed electrode and movable electrode However, if servo control is performed, the servo control establishes a linear relationship between the Coriolis force Fc and the detected displacement y as shown in Expression 2. Since the displacement y is maintained at almost 0, the relationship between the displacement y and ΔC is also linear. Expression 5 is a formula to calculate the servo force Fs acting on the servo electrodes 37, 38. It is found from this expression that by keeping the displacement y to a minimum, even the parallel plate type servo electrodes can establish a linear relationship between the servo force Fs and signal voltage Vs. In short, all items associated with the sensor output establish a linear relationship with input angular velocity Ω, thereby improving the output linearity of the sensor.

[Expression 5]

$$|Fs_{37} - Fs_{38}| = \varepsilon A \left( \frac{(V_{bs} + V_s)^2}{(g+y)^2} - \frac{(V_{bs} - V_s)^2}{(g-y)^2} \right) \quad (5)$$

$$Fs = \{|Fs_{37} - Fs_{38}|\}_{y \to 0} = \frac{4\varepsilon A V_{bs} V_s}{g^2}$$

Where:
$Fs_{37}$, $Fs_{38}$: electrostatic force generated in respective servo electrodes 37, 38
A: area ratio between fixed electrode and movable electrode of servo electrodes 37, 38
Vbs: bias voltage of servo electrode
Vs: signal voltage from D/A converting unit 71

As indicated by Expression 2, the detected displacement y is proportional to the mechanical quality factor Qy of the detecting vibration system composed of the Coriolis elements 2B, 3B and detection beams 36. If the natural frequency of the detecting vibration system is in agreement with the frequency of the driving signal Vd, the detected displacement y is increased by Qy times by resonance phenomenon compared with when the natural frequency of the detecting vibration system is far enough apart from the frequency of the driving signal Vd. With the phenomenon, a large detection amplitude y can be obtained for the input angular velocity Ω, thereby improving the sensitivity of the sensor. However, the utilization of the resonance phenomenon increases the detected amplitude y by Qy times and it takes a certain time period to reach the maximum amplitude. This may impose a limit on the response speed of the sensor. In addition, the mechanical quality factor Qy greatly depends on the sealing pressure imposed on the sensor element S3E. Because of this, initial variations in the sealing pressure and time-varying fluctuations of the sealing pressure also vary the Qy, which may cause variations and fluctuations in sensor sensitivity.

However, by using servo control, the feedback operation is completed in an almost infinitesimal time period and the detected displacement y is minimized to an almost infinitesimal value. Even though the detected displacement y is fed back, the Coriolis force Fc is offset by the servo force Fs and the value of a voltage applied to generate the servo force Fs is eventually defined as a sensor output value. In short, adding electrical damping by the servo control can minimize the influence of Qy. Therefore, even if the natural frequency of the detecting vibration system is in agreement with the frequency of the driving signal Vd, prompt response can be obtained, and even if initial variations in the sealing pressure and time-varying fluctuations of the sealing pressure occur, the sensitivity of the sensor can be maintained at a certain level.

Figure 9:
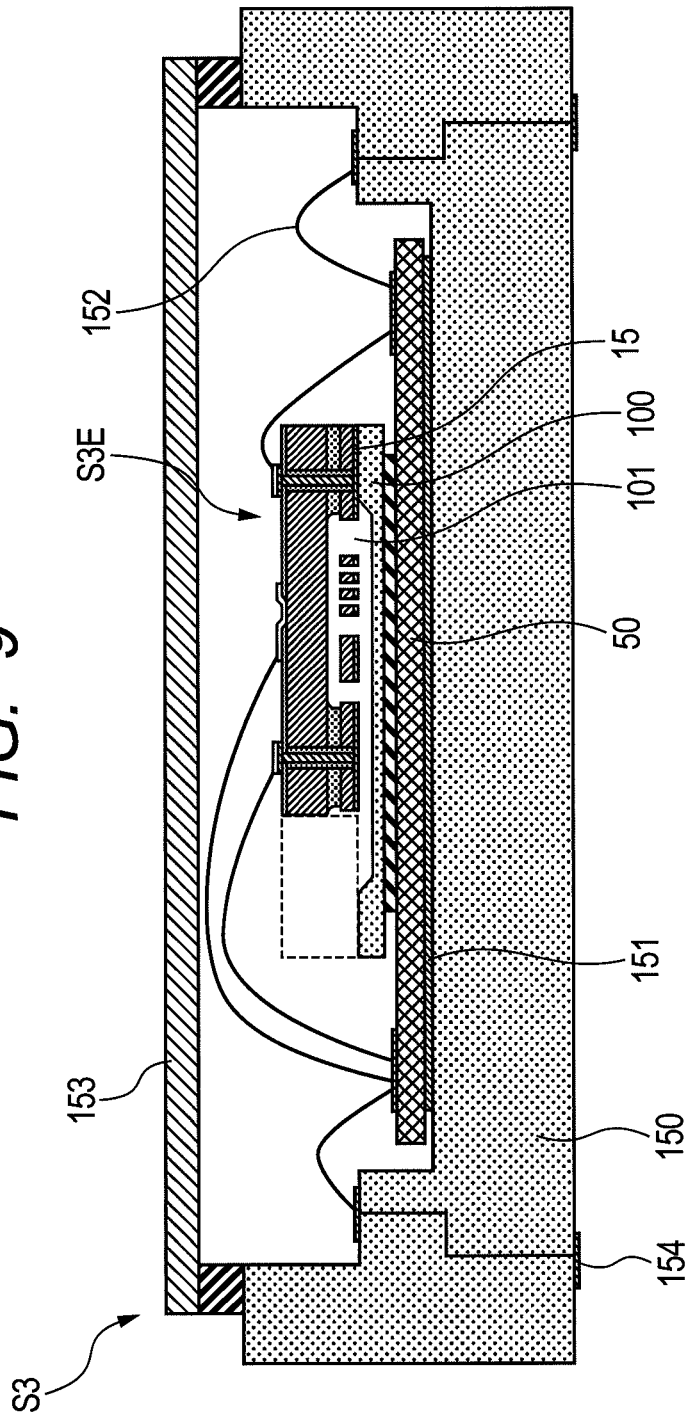
FIG. 9 illustrates packaging of the angular rate sensor according to Embodiment 3.

FIG. 9 shows packaging of the sensor. A cap 100 is placed and bonded on the base 15 so as to cover the angular rate sensor element S3E. This cap 100 is, for example, a glass substrate and is bonded with the silicon base 15 by anodic bonding. In addition, it is possible to form on the cap 100 a gas absorbent (getter) film that controls time-varying pressure fluctuations of a space 101.

The capped angular rate sensor element S3E is mounted on a ceramic package 150 with an LSI 50 for signal processing. First, the LSI 50 is secured on the ceramic package 150 with adhesive 151, and then the angular rate sensor element S3E is adhered to the LSI 50. Second, the LSI 50, the angular rate sensor element S3E, an external input/output terminal 154 of the ceramic package 150 are wire-bonded with conductive wires 152. At last, the package is sealed with a cover 153 to finish the sensor.

Although not shown in the drawings, the PKG in which the sensor element S3E, LSI 50 and other contents are placed may be a plastic PKG, instead of the ceramic PKG 150, or any type of PKG as long as it can protect the contents, such as the conductive wires 152, and can input/output signals with an external device.

As described above, the present embodiment can provide a high-performance inertial sensor that can maintain a SNR even in an environment where vibration disturbance exists. In addition, the sensor includes supporting beams that are stiff in the direction (y-direction: second direction) that is different from the anti-phase vibration direction (x-direction: first direction) of the driven elements, thereby securing a high value Q. Furthermore, adoption of the Y-shaped driven elements and placement of the supporting beams at the three ends of the driven elements can enhance the rotational stiffness in the z-axis direction and about the x-axis, y-axis and z-axis and can separate natural frequency associated with unwanted modes, such as rotational mode and torsional mode, for the x-axis and y-axis from a drive/detection mode frequency translating with the x-axis and y-axis.

In the foregoing, the invention made by the inventors of the present invention has been concretely described based on the embodiments. However, it is needless to say that the present invention is not limited to the foregoing embodiments and various modifications and alterations can be made within the scope of the present invention.

Embodiment 4

Figure 10:
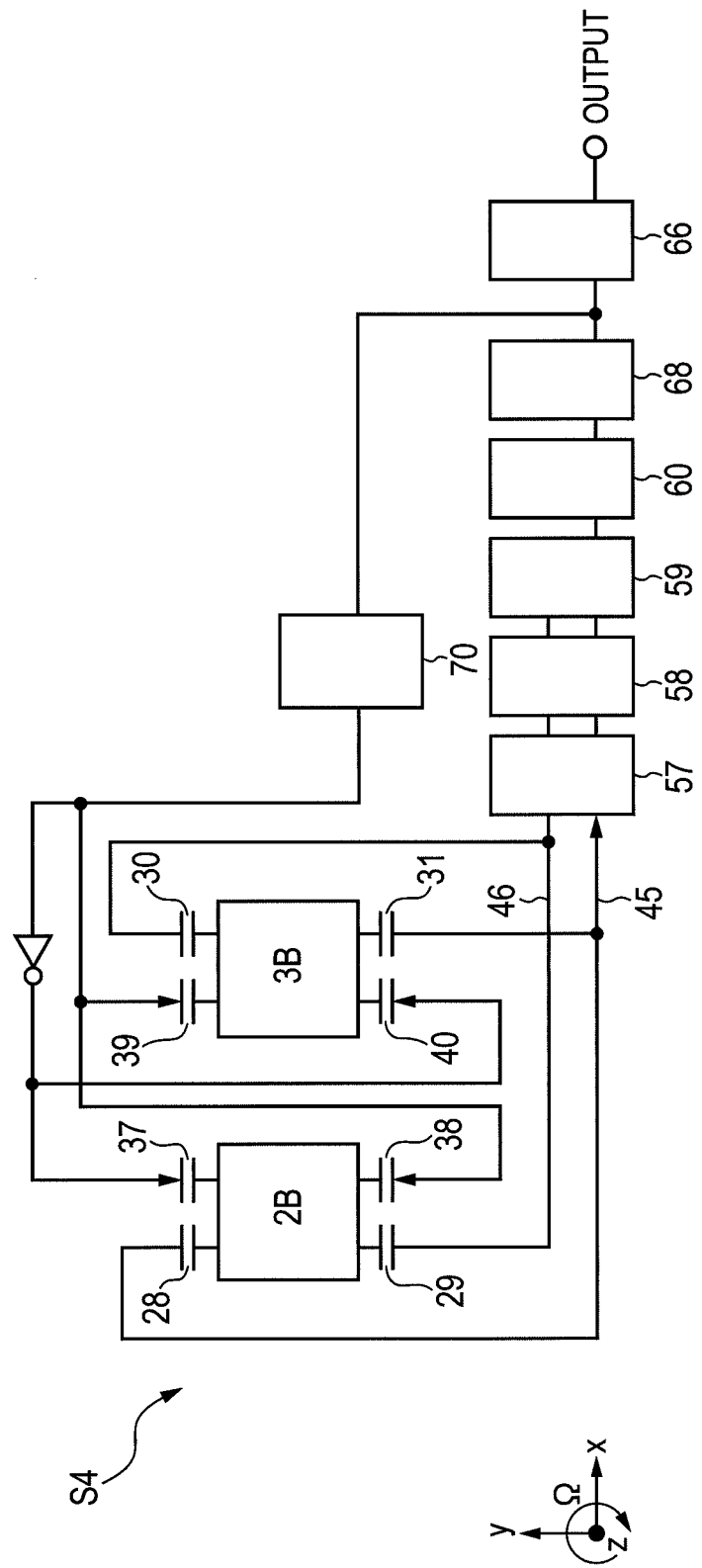
FIG. 10 is a conceptual diagram of a detection/servo circuit in the inertial sensor (angular rate sensor) according to Embodiment 4.

Embodiment 4 will be described with reference to FIG. 10. The matter described in any of Embodiments 1 to 3, but not described in Embodiment 4 can be applied to Embodiment 4 unless there are specific reasons. FIG. 10 is a circuitry diagram showing detecting electrodes 28, 29, 30, 31 and servo electrodes 37, 38, 39, 40 of Coriolis elements 2B, 3B in the angular rate sensor S4 according to Embodiment 4 and the circuit configuration. The method for fabricating the sensor elements, structure, driving circuits and other components and circuits are the same as those in the angular rate sensor S3 of Embodiment 3, and the explanation will be omitted.

According to Embodiment 4, the detecting electrodes (28 and 31, 29 and 30) whose electrostatic capacitance changes in the same direction (in a decreasing direction and in an increasing direction when the Coriolis elements 2B, 3B are displaced in anti-phase in the second direction (y-direction) are electrically connected with each other before the C/V converting unit.

When an angular velocity S2 about the z axis is applied to the Coriolis elements 2B, 3B oscillating in anti-phase, the Coriolis elements 2B, 3B generate Coriolis force Fc in the y-direction, and oscillation y occurs in the y-direction in proportion to the applied angular velocity Ω. Since the Coriolis elements 2B, 3B oscillate in anti-phase along the first direction (x-direction) with the driven elements 2A, 3A, the oscillation in the y-direction is also in anti-phase.

The angular rate sensor S4 of Embodiment 4 also includes servo electrodes 37, 38, 39, 40 as with the angular rate sensor S3 of Embodiment 3. The signal having passed through a synchronous detecting unit 60, in other words, detected displacement y derived from Coriolis force Fc (force of drive frequency component) is reduced to nearly 0 by using the servo control and the electrostatic force Fs of the servo electrodes 37, 38, 39, 40. However, displacement y in the detecting direction derived from oscillations having other frequency components cannot be reduced even if servo control is executed, and oscillation occurs consequently.

In the angular rate sensor S4 of Embodiment 4, the detecting electrodes 28 and 31 and the detecting electrodes 29 and 30 whose electrostatic capacitance changes in the same direction (in a decreasing direction and in an increasing direction when the Coriolis elements 2B, 3B oscillate in anti-phase in the y-direction are electrically connected with each other before the C/V converting unit 57. With this electrode configuration, when the Coriolis elements 2B, 3B oscillate in anti-phase in the y-direction, an output in proportion to the anti-phase vibration amplitude can be obtained at the differential detecting unit 59. On the other hand, when the Coriolis elements 2B, 3B oscillate in phase, the capacitance of the detecting electrodes 45, which is the total capacitance of the detecting electrodes 28, 31 and the capacitance of the detecting electrodes 46, which is the total capacitance of the detecting electrodes 29, 30 do not change because an increase in the capacitance of the detecting electrodes 28, 30 decreases the capacitance of the detecting electrodes 29, 31. Specifically, the sensor can have electrodes sensing only anti-phase vibrations and not reacting to in-phase vibrations irrespective of the frequency of vibration disturbance.

In addition, since the in-phase vibration components are offset before being input to the C/V converting unit 57, even if a large in-phase vibration component occurs, the C/V converting unit 57 and the A/D converting unit 58 are not saturated, thereby maintaining the functions as a sensor. Although not shown in the drawings, the sensor may be combined with a physical vibration damping device, such as a vibration-proof structure characteristically not effective to damp low-frequency vibrations, but effective to damp high-frequency vibrations. The combination allows the vibration damping device to remove high-frequency vibration disturbance components and the angular rate sensor S4 of Embodiment 4 to offset low-frequency vibration disturbance components, thereby providing a more robust (stronger) sensor against vibration disturbance.

Coupling the four detecting electrodes 28, 29, 30, 31 into two electrodes 45, 46 makes signals to be input to the servo control unit 68 into one signal, and a single control signal reversed only in phase is input to each servo electrode. As with the detecting electrodes 45 and 46, the servo electrodes 37 and 40 and the servo electrodes 38 and 39 whose electrostatic capacitance changes in the same direction (in a decreasing direction and in an increasing direction when the Coriolis elements 2B, 3B oscillate in anti-phase in the y-direction are electrically connected with each other. The detection and servo circuit structure of the angular rate sensor S4 of Embodiment 4 can be reduced in scale by about half in comparison with the detection and servo circuit structure of the angular rate sensor S3 of Embodiment 3 shown in FIG. 8, which is advantageous for miniaturization and cost-reduction of the LSI 50.

The signal from the servo control unit 68 passes through a LPF (low-pass filter) 66 that outputs the signal as a value of the applied angular velocity.

As described above, the present embodiment can achieve the same effect as Embodiment 3. In addition, electrically connecting the detecting electrodes, before the C/V converting unit, whose electrostatic capacitance changes in the same manner when the two Coriolis elements oscillate in anti-phase in the y-direction (second direction) can provide an electrode structure that does not react to in-phase vibrations, but senses only the anti-phase vibrations irrespective of the frequency of vibration disturbance.

In the foregoing, the invention made by the inventors of the present invention has been concretely described based on the embodiments. However, it is needless to say that the present invention is not limited to the foregoing embodiments and various modifications and alterations can be made within the scope of the present invention.

Detailed description of the present invention has been made. The following is a list of principal embodiments of the present invention.

(1) A vibration type inertial sensor including: two dead weights; means for displacing the two dead weights in anti-phase with each other along a first direction; two sets of first electrodes detecting displacements of the two dead weights in the first direction as capacitance changes; two sets of second electrodes detecting displacements of the two dead weights in a second direction different from the first direction as capacitance changes; a first C/V converting unit converting the capacitance changes of the first electrodes into electrical signals; and a second C/V converting unit converting the capacitance changes of the second electrodes into electrical signals, wherein the first electrodes of a set whose electrostatic capacitance increases when the two deadweights are displaced in anti-phase in the first direction are electrically connected with each other, the first electrodes of the other set whose electrostatic capacitance decreases when the two dead weights are displaced in anti-phase in the first direction are electrically connected with each other, and the respective sets of the first electrodes are connected with the first C/V converting unit.

(2) A vibration type inertial sensor comprising: two dead weights; means for displacing the two dead weights in anti-phase with each other along a first direction; two sets of first electrodes detecting displacements of the two dead weights in the first direction as capacitance changes; two sets of second electrodes detecting displacements of the two dead weights in a second direction different from the first direction as capacitance changes; a first C/V converting unit converting the capacitance changes of the first electrodes into electrical signals; and a second C/V converting unit converting the capacitance changes of the second electrodes into electrical signals, wherein, the second electrodes of a set whose electrostatic capacitance increases when the two dead weights are displaced in anti-phase in the second direction are electrically connected with each other, the second electrodes of the other set whose electrostatic capacitance decreases when the two dead weights are displaced in anti-phase in the second direction are electrically connected with each other, and the respective sets of the first electrodes are connected with the second C/V converting unit.

INDUSTRIAL APPLICABILITY

The present invention can be widely used in a field of sensors for sensing attitudes of vehicles and robots, stabilizing digital camera images, sensing attitudes and location in navigation systems, and sensing attitudes in video game systems. Especially, the sensor is expected to demonstrate outstanding performance when used in mobile units or when used near vibration generating sources, such as a motor, a valve, and a speaker.

LIST OF REFERENCE SIGNS

S1: angular rate sensor; S2: angular rate sensor; S3: angular rate sensor; S4: angular rate sensor; 1a: supporting substrate; 1b: insulating interlayer; 1c: conductive layer; 2: dead weight; 2A: driven element; 2B: Coriolis element; 3: deadweight; 3A: driven element; 3B: Coriolis element; 4: hole; 5: supporting beam; 6: anchor; 7: linking beam; 8: driving electrode; 8A: driving electrode; 8B: driving electrode; 9: driving electrode; 9A: driving electrode; 9B: driving electrode; 10: common electrode; 11: drive amplitude monitoring electrode; 11A: drive amplitude monitoring electrode; 11B: drive amplitude monitoring electrode; 12: drive amplitude monitoring electrode; 12A: drive amplitude monitoring electrode; 12B: drive amplitude monitoring electrode; 13: detecting electrode; 14: detecting electrode; 15: base; 16: through via; 17: through via; 18: through via; 19: through via; 20: through via; 21: through via; 22: through via; 23: through via; 24: through via; 25: insulating film; 26: polysilicon (conductor film); 27: through via; 28: detecting electrode; 29: detecting electrode; 30: detecting electrode; 31: detecting electrode; 32: through via; 33: through via; 34: through via; 35: through via; 36: detection beam, 37: servo electrode; 38: servo electrode; 39: servo electrode; 40: servo electrode; 41: through via; 42: through via; 43: through via; 44: through via; 45: detecting electrode; 46: detecting electrode; 47: substrate electrode, 50: LSI, 51: AFC, 52: AGC, 53: C/V converting unit; 54: A/D converting unit; 55: differential detecting unit; 56: synchronous detecting unit; 57: C/V converting unit; 59: differential detecting unit; 58: A/D converting unit; 60: synchronous detecting unit; 61: C/V converting unit; 62: A/D converting unit; 63: differential detecting unit; 64: synchronous detecting unit; 65: differential processing unit; 66: LPF (low-pass filter); 68: servo control unit; 69: servo control unit; 70: D/A converting unit, 71: D/A converting unit, 100: cap, 101: space, 150: package, 151: adhesive, 152: wire, 153: cover; 154: external input/output terminal; 200: free beam.

The invention claimed is:

1. A vibration type inertial sensor comprising:
two dead weights;
two sets of driving electrodes applying driving signals to the two dead weights, the signals for displacing the two dead weights in anti-phase with each other along a first direction;
two sets of first electrodes detecting displacements of the respective two dead weights as electrostatic capacitance changes; and
a first C/V converting unit converting the capacitance changes of the first electrodes into electrical signals, wherein
the first electrodes in a set whose electrostatic capacitance changes in a third direction when the two dead weights are displaced in anti-phase in the first direction are electrically connected with each other, the first electrodes of the other set whose electrostatic capacitance changes in a fourth direction opposite to the third direction when the two dead weights are displaced in anti-phase in the first direction are electrically connected with each other, and the respective sets of the first electrodes are connected with the first C/V converting unit.

2. The inertial sensor according to claim 1, wherein the two sets of the first electrodes detect the displacements of the respective two dead weights in the first direction as electrostatic capacitance changes.

3. The inertial sensor according to claim 2 further comprising: two sets of second electrodes detecting displacements of the respective two dead weights along a second direction different from the first direction as electrostatic capacitance changes; and a second C/V converting unit converting the capacitance changes of the second electrodes into electrical signals, wherein the second electrodes in a set whose electrostatic capacitance changes in a fifth direction when the two dead weights are displaced in anti-phase in the second direction are electrically connected with each other, the second electrodes in the other set whose electrostatic capacitance changes in a sixth direction opposite to the fifth direction when the two dead weights are displaced in anti-phase in the second direction are electrically connected with each other, and the respective sets of the second electrodes are connected with the second C/V converting unit.

4. The inertial sensor according to claim 3 further comprising two sets of servo electrodes controlling oscillations in the second direction by electrostatic force, wherein, the servo electrodes in a set whose electrostatic capacitance changes in a seventh direction when the two dead weights are displaced in anti-phase in the second direction are electrically connected with each other, and the servo electrodes in the other set whose electrostatic capacitance changes in a eighth direction opposite to the seventh direction when the two dead weights are displaced in anti-phase in the second direction are electrically connected with each other.

5. The inertial sensor according to claim 1, wherein the two dead weights are mechanically coupled with each other to form a tuning fork structure having a path for oscillation energy.

6. The inertial sensor according to claim 5, wherein the lowest vibration mode frequency of the two dead weights in the first direction, in the second direction different from the first direction, or in both the directions is an in-phase vibration mode, and the second lowest vibration mode is an anti-phase vibration mode.

7. The inertial sensor according to claim 5, wherein each of the two dead weights includes: a driven element supported by supporting beams that are easy to be displaced in the first direction and hard to be displaced in the second direction different from the first direction; and a Coriolis element suspended from the driven element with detection beams that are hard to be displaced in the first direction and easy to be displaced in the second direction, the Coriolis element being displaced in the second direction in proportion to applied angular velocity while following the motion of the driven element.

8. The inertial sensor according to claim 7, wherein the lowest vibration mode frequency of the two driven elements of the two dead weights is an in-phase vibration mode in the first direction, and the second lowest vibration mode is an anti-phase vibration mode.

9. The inertial sensor according to claim 7, wherein the lowest vibration mode frequency of the two Coriolis elements of the two dead weights is a mode of translational vibration in the second direction.

10. The inertial sensor according to claim 7, wherein the driven element is in the shape of a letter Y and has three ends at which the supporting beams are placed.

11. The inertial sensor according to claim 7, wherein the first electrodes form a comb finger structure.

12. The inertial sensor according to claim 3, wherein the two sets of the first electrodes detect displacements of the respective two dead weights in the second direction different from the first direction as electrostatic capacitance changes.

13. The inertial sensor according to claim 1 further comprising a high frequency vibration damping device for damping high frequency vibration disturbance components.

* * * * *